United States Patent
Notani

(10) Patent No.: US 9,923,850 B2
(45) Date of Patent: Mar. 20, 2018

(54) SYSTEM AND COMPUTER PROGRAM PRODUCT FOR TRANSACTIONAL, ADDRESSABLE COMMUNICATION

(71) Applicant: Ranjit Notani, Plano, TX (US)

(72) Inventor: Ranjit Notani, Plano, TX (US)

(73) Assignee: TMail Inc., Plano, TX (US)

(*) Notice: Subject to any disclaimer, the term of this patent is extended or adjusted under 35 U.S.C. 154(b) by 248 days.

(21) Appl. No.: 14/536,596

(22) Filed: Nov. 8, 2014

(65) Prior Publication Data

US 2015/0236993 A1    Aug. 20, 2015

Related U.S. Application Data

(63) Continuation-in-part of application No. 11/669,660, filed on Jan. 31, 2007, now abandoned.

(51) Int. Cl.
G06F 15/16 (2006.01)
H04L 12/58 (2006.01)
G06Q 10/10 (2012.01)

(52) U.S. Cl.
CPC ........ *H04L 51/063* (2013.01); *G06Q 10/107* (2013.01); *H04L 51/08* (2013.01); *H04L 51/16* (2013.01); *H04L 51/28* (2013.01)

(58) Field of Classification Search
USPC ........................................................ 709/206
See application file for complete search history.

(56) References Cited

U.S. PATENT DOCUMENTS

| | | | | |
|---|---|---|---|---|
| 7,653,668 B1* | 1/2010 | Shelat | ................. | G06F 11/2094 707/610 |
| 2002/0099775 A1* | 7/2002 | Gupta | .................. | G06Q 10/107 709/205 |
| 2004/0123108 A1* | 6/2004 | Winkler | ................ | H04L 9/3247 713/176 |
| 2006/0095476 A1* | 5/2006 | Dauer | .................. | G06Q 10/107 |
| 2006/0236249 A1* | 10/2006 | Weissman | ............ | G06Q 10/107 715/752 |
| 2007/0113101 A1* | 5/2007 | LeVasseur | ........... | G06Q 10/107 713/189 |

* cited by examiner

*Primary Examiner* — Vivek Srivastava
*Assistant Examiner* — Hermon Asres
(74) *Attorney, Agent, or Firm* — Karl L. Larson

(57) ABSTRACT

A system and computer program product for providing a transactional, addressable message over a network. The system includes a first node connectable to the network for generating and communicating a non-duplicated shared message having content and accessible to at least two users and for routing a reference to the shared message, a second node connectable to the network for receiving the reference to the shared message. The shared message includes a unique identifier, an address section, a metadata section, a comments section, and a content section, and is identified over the network using the unique identifier. The shared message is accessible to the second node via the reference. The content of at least one section of the shared message is transactionally modifiable after the second node has received the shared message. A change to the content of the modifiable section of the shared message is persistent with respect to the at least two users.

26 Claims, 7 Drawing Sheets

1

SYSTEM AND COMPUTER PROGRAM PRODUCT FOR TRANSACTIONAL, ADDRESSABLE COMMUNICATION

CROSS REFERENCE TO RELATED APPLICATIONS

The present application is a continuation-in-part of and claims priority to U.S. patent application Ser. No. 11/669,660, entitled "System and Method for Transactional, Addressable Communication," filed in the U.S. Patent and Trademark Office on Jan. 31, 2007, having at least one common inventor as the present document and is hereby incorporated by reference.

BACKGROUND OF THE INVENTION

Field of the Invention

The present invention is generally related to transactional, addressable communication, and more particularly to a system and computer program product for transactional, addressable communication.

Discussion of the Background

Electronic mail ("email") was invented back in the 1970's and has since become an indispensable tool for businesses. The reasons for email's popularity are its ubiquity, ease of use, inexpensiveness and broad functionality. From a functional standpoint email is used for messaging, collaboration, task management, information storage, and the like. Despite the rise of alternatives such as text messaging, social networking and specialized collaboration apps, email still reigns supreme, especially in business contexts. Email has become a critical business and social tool used for everything from the exchange of letters to the negotiation of business documents. By some estimates email is the most popular and crucial method of communication over the Internet.

The term "email" applies both to messaging systems based upon the Simple Mail Transfer Protocol (SMTP) as well as to Intranet groupware systems, such as Microsoft Exchange, which do not use the same protocols and storage formats as traditional SMTP mail servers, but are interoperable with SMTP systems and present the same interface as traditional email programs.

Email is a store-and-forward system allowing multiple people to compose, send, receive, and store electronic messages over a network. Pieces of information are formatted and sent around in discrete chunks, each known as an email or an email message. These messages are usually composed on a client computer in a mail user agent (MUA) or in the context of a browser for webmail. The user's content is then wrapped in an envelope of headers containing metadata about the message. The wrapped message is then handed to an SMTP server which routes the message to other SMTP servers in the delivery path. Typically, the sender retains a copy of the message in a Sent Messages folder and the receiver receives a copy in his or her Inbox. The receiver can then store the message, or create a new message from the contents of the received message by replying or forwarding the message.

Despite their incredible strengths, traditional email systems have some major flaws as well. There is no way to easily update content in traditional email systems because all content is additive. Email attachments do not solve this deficiency. Attachments might be updated outside of traditional email systems and then re-attached. However, this commonly results in multiple incompatible versions of attachments being sent around. Users don't know what the authoritative version is and, consequently, users will often update the non-latest version, thus effectively losing changes potentially made by other users. Additional users might modify those versions thus further compounding the problem. For any reasonably involved collaboration with multiple parties the situation is unworkable.

There is no way to precisely refer to an email. Emails are only referred to (or addressed) imprecisely. The lack of addressability of emails in a traditional email system severely cripples the kinds of things one can do with email.

Email is overrun by spam. Whole businesses have sprung up around providing spam filters for traditional email systems. Unfortunately, because email doesn't provide native support for handling spam, spam filters only keep one step ahead of the spammers, if at all.

The identity of the sender of an email is easily spoofable. Since email is completely decentralized, adoption of any standards to even attempt preventing email spoofing is virtually impossible.

Email lacks the ability to guarantee delivery. This makes relying on email for any mission critical process or communication a very risky proposition.

Email lacks the notion of a certified email or, said another way, proof-of-sending. Once again this makes relying on email for any mission critical process or communication a very risky proposition. Email also lacks the notion of certified content. Notably, email lacks the ability to certify that the content received is the same as the content sent. Even physical messaging services like US Postal Service, FedEx or UPS can only certify the sender, but not the content of the message.

Email lacks the notion of an authoritative, mutually agreeable versioned audit trail. In the prior art, every party to an email chain is entitled to their own and it is commonly no possible to reconstruct an authoritative audit trail of the email chain. This uncertainty makes it difficult to rely on email for mission-critical business processes.

The present invention overcomes these and other limitations associated with email systems while preserving essential characteristics of email.

SUMMARY OF THE INVENTION

Accordingly, one aspect of the present invention is to provide a system for providing a transactional, addressable message over a network. The system includes a first node connectable to the network for generating and communicating a non-duplicated shared message having content and accessible to at least two users and for routing a reference to the shared message, a second node connectable to the network for receiving the reference to the shared message. The shared message includes a unique identifier, an address section, a metadata section, a comments section, and a content section. The shared message is identified over the network using the unique identifier and the shared message is accessible to the second node via the reference. The content of at least one section of the shared message is transactionally modifiable after the second node has received the shared message. A change to the content of the modifiable section of the shared message is persistent with respect to the at least two users.

Another aspect of the present invention is to provide a computer program product embodied on a non-transitory computer readable medium for creating a transactional, addressable communication over a network. The computer program is implemented by one or more processors executing processor instructions. The computer program product includes a first computer code for selecting a context for the communication, a second computer code for selecting a type for the communication, a third computer code for using the context and type to instantiate a non-duplicated shared message data structure having content and accessible to at least two users for the communication, a forth computer code for populating the address, metadata, and content sections in the shared message data structure, a fifth computer code for routing a reference to the shared message data structure to a destination over a network, a sixth computer code for validating the shared message data structure, a seventh computer code for storing the shared message data structure, and an eighth computer code for transactionally modifying, at the destination, the content of at least one section of the shared message data structure. The shared message data structure comprises a unique identifier, an address section, a metadata section, and a content section. The shared message data structure is identified over the network via the unique identifier and the shared message data structure is individually accessible to the destination via the reference. A change to the content of the modifiable section of the shared message data structure is persistent with respect to at least two users.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein.

DETAILED DESCRIPTION OF THE PREFERRED EMBODIMENTS

Figure 1:
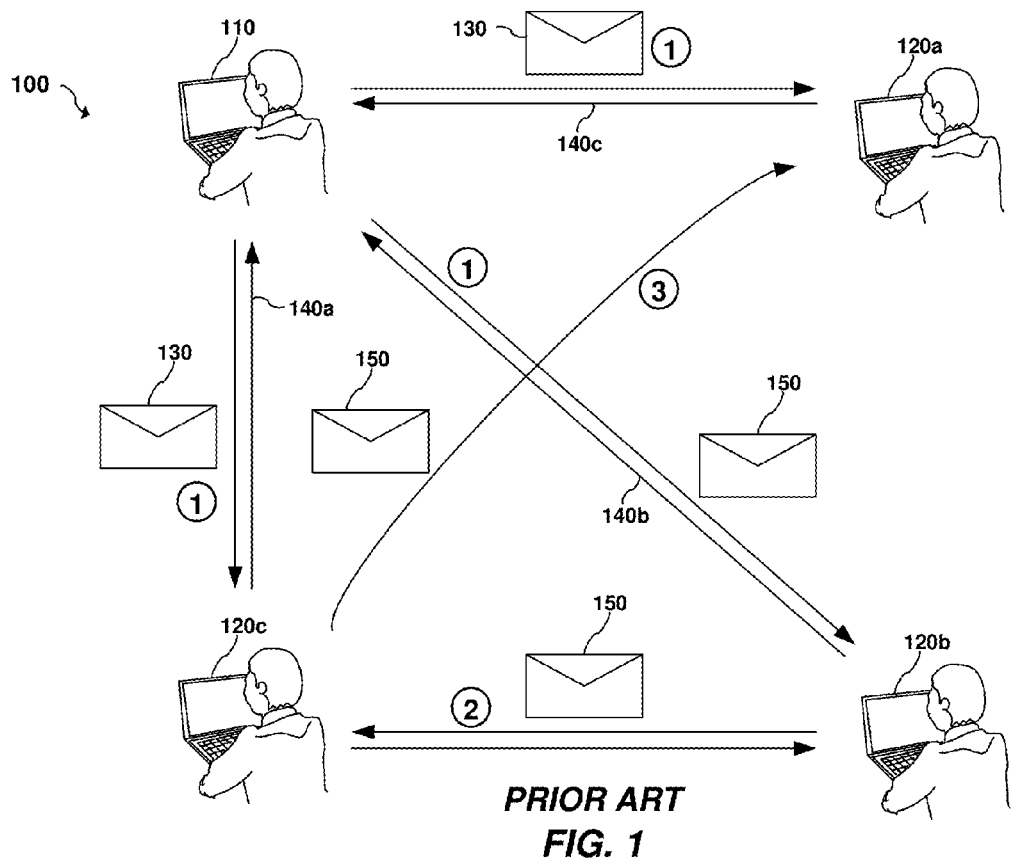
FIG. 1 is a block diagram illustrating an attempted collaboration model using traditional email known in the prior art.

Referring now to the drawings, wherein like reference numerals designate identical or corresponding parts throughout the several views, preferred embodiments of the present invention are described.

The present invention discloses a system allowing for a transactional, addressable communication over a network. According to various embodiments, the system includes a first node connectable to the network for generating a shared mail object (also sometimes referred to herein as a "TMail," "transactional, addressable communication," "transactional, addressable mail message," "transactional, addressable mail messaging system", or "TAMM") and a second node connectable to the network for receiving the message that refers to the shared mail object. The mail object is individually addressable over the network. According to at least one embodiment, the mail object includes, without limitation, an address section, a metadata section, one or more updateable content sections, and at least one section of the mail object is modifiable after the second node has received the message.

Email systems known in the prior art are non-transactional. According to at least one embodiment, the present invention utilizes transactional messaging. According to the present invention, "transactional messaging" utilizes a set of ACID (atomicity, consistency, isolation, durability) properties that guarantee that the transactions are processed reliably. In a transactional messaging system, all changes to a shared mail object happen (including message delivery) or none happen (atomicity). Next, the mail object and related messages progress from one consistent state to another (consistency). Next, if two or more users attempt to send a message that includes content modification, then the first user will succeed, while the second user will be notified that they need to merge any in-progress changes (isolation). Finally, the resulting message object (and its history) is stored persistently (durability). Transactional messaging occurs, without limitation, when one or more sections of a shared mail object is modified: (i) a corresponding comment is generated, (ii) the addressee list is optionally expanded, (iii) a unique identifier is optionally generated (if the mail object is being created for the first time), (iv) the latest version number is incremented, and (v) related messages are delivered in a single atomic transaction.

According to the present invention, changes to a modifiable section of a transactional, addressable communication persist. Modifiability is desirable because it allows users to have a single version of the truth of some content. Modifications are done in such a way that uses can (i) see the latest state of the content, (ii) see how some content evolves over time (with shared, agreed, authoritative audit trails), (iii) authoritatively compare the latest and the previous states of content (also known as Certified Differences), (iv) prevent unintended "forking" of content by ensuring that modifications are applied to the latest state, and (v) if content is deliberately forked, then authoritatively represent and guarantee the precise version and state at which the content was forked so that it may be later merged back if necessary.

Transactional modifications are made according to ACID properties, where all modifications in a transaction happen or don't happen at all (atomicity), the transactional object proceeds from one consistent state to another consistent state (consistency), concurrent modifications to a transactional object result in a system that would be obtained if the transactions were executed serially isolation), and once a transaction is committed, it will remain so even in the presence of power loss, crashes, and the like (durability).

Non-transactional modifiability is sufficient when there is only one user, or users are not making concurrent modifications. However, email has multiple users who work in a decoupled manner (and hence will typically be working concurrently) and thus to the extent that one wishes to introduce modifiability into such a system, one must support concurrent modifications and hence one must support transactional modifiability if one is to avoid the problems of concurrent non-transactional modifications. (i.e., the lack of ACID properties). Attempts to solve this problem in the prior art have included locking, but this approach has proven unworkable because it goes against the very essence of email where emails are never locked.

Various embodiments of the present disclosure provide a novel messaging infrastructure and Internet application that is a departure from the store-and-forward, message-oriented nature of conventional email, including improvements directed toward collaboration. Collaboration can be modeled as a series of interactions undertaken to reach some goal or conclusion. For example, organizing a party is one example of collaboration under this model. The party organizer interacts with prospective party participants to inform them about the prospective party, negotiate times and places, and receive confirmations about attendance.

The present invention discloses an email-like service that adds major functional capabilities to those existing in the prior art as well as overcoming many of the flaws of traditional email systems. According to at least one embodiment, a "TMail" (or TAMM) represents a single TMail object in the system. The closest email analogy would be an email thread. The verb 'To TMail' represents the act of creating or modifying a TMail. A variant of this would be "TMailing".

The major benefits of TMail are: (i) (Inline) Collaboration with updateability which vastly improves the collaboration capabilities compared to traditional email system; (ii) significantly better support for 'Official Business' functions relative to email, such as support for guaranteed delivery, certified mail (i.e., proof of sending), certified content, tamper-proof shared, authoritative versioned audit trails; (iii) addressability (like a web page); (iv) reduced spam; and (v) improved task management compared to email.

(Inline) Collaboration

One of the major uses of a traditional email system is in enabling collaboration between users. Collaboration is a loosely used term that can mean different things to different people based on the context. In the context of a traditional email system, collaboration is usually the exchange of messages between users to arrive at some result or conclusion. For simple types of collaboration, such as notification of an upcoming meeting, basic message exchange usually suffices. However, for more complex collaboration, attachments are typically exchanged between users. Users update the attachments and respond. The state of the attachment or attachments represents the state of the collaboration. Attachments are meant to represent the 'updateable state' of the email discussion. While this paradigm works it has some major drawbacks. Traditional email system generates many versions of the attachment scattered in many different messages. It is therefore difficult if not impossible for the user to be sure that they are updating the latest version of the attachment. It is also difficult for users to know what the true latest state of the attachment or attachments is. In multi-attachment emails, different attachments could be at different version levels. This results in large amounts of time being spent trying to comprehend what the latest state of the attachment is. Further, large amounts of time are spent trying to merge and reconcile different versions of attachments. This problem becomes more pronounced as the number of updaters and the number of updates increases.

The most common attempted "solution" to this problem is the "email+shared document system in the middle" approach. In this approach all users have access to a shared document system. This way, instead of passing attachments around, the users pass references to the documents "in the middle". Examples of such "in-the-middle" systems include Shared Folders, Google Docs, Microsoft SharePoint, Box.Net etc. While these systems seem to solve the attachment version problem they introduce some severe problems of their own that has precluded adoption of this approach (as an alternative to email attachments). In particular, these systems introduce problems in permissions, immutability, and consistency.

Permissions Problem: The "permissions" on the email thread may be different than the "permissions" on the shared document. For example, assume that Joe and Bob are two initial collaborators on an email. Joe creates a shared document that he and Bob can access. Joe and Bob update the "document in the middle" and mail each other. The email thread now expands to include Jill, but Jill does not have access to the document. So when Jill clicks on the link she gets a permission violation. One possible way to solve this problem is to constantly keep the two systems in synch (also referred to as "keep-permissions-in-synch" solution). As the email thread expands, someone needs to go and (potentially) expand the permissions on the shared document or documents. However, this approach is essentially unworkable for all but the most static groups of people. One approach to this problem suggested in the prior art is to try to automate this permissions synchronization problem between the email system and the document-in-the-middle system. Unfortunately, these approaches are doomed to failure because there is no way in email to capture the intent of the user relative to whether the user wants the document-in-the-middle to be shared or copied. As described above, in a traditional email system, content (including attachments) is always copied. This is true regardless of whether the user uses "Reply," "Reply All," or "Forward."

Any system attempting to solve the permissions synchronization problem must be able to discern user intent relative to sharing or copying. Although this is not explicitly addressed in the prior art several approaches are possible.

An "always share" approach requires that emails never be forwarded in the traditional sense. In traditional forwarding, the email thread is 'forked' and a new thread is begun with (typically) a different set of users. If a forwarded email also has access to the document-in-the-middle, then as emails got forwarded around, the read/write access to the document-in-the-middle is uncontrollably and continuously expanded. Importantly, once the original email is forwarded, the original users have no control over the further forwarding by new users. The always share approach is therefore completely unworkable.

A share and copy approach for all email replies and forwards, respectively, is also unworkable. Under this approach, the "Reply" and "Reply All" email functions are used to indicate "share," and the "Forward" email function is used to indicate a "copy." However, this approach doesn't preclude users from modifying the addressee list during these functions which is problematic. In particular, severe problems are introduced if the new addressee list is a subset of the previous one. For example, assume an original email with Joe, Bob and Bill. Joe replies to the email, but only addresses Joe and Bob, adds James, and leaves Bill out. This results in a contradictory state. In the second email, Bob is not part of the thread and yet he still has access to the document-in-the-middle. As Joe, Bob and James collaborate using the second email, Bob could be effectively modifying their email thread despite not being on the list of addressees. This is completely unworkable.

As noted above, approaches known in the prior art that attempt to synchronize permissions between email and document-in-the-middle systems are fundamentally unworkable because traditional email lacks any way to indicate whether users intend to share or copy.

In practice, attempts to solve this traditionally are to make the shared document system open to "all" ("escalate-permissions-to-all" approach). The meaning of "all" depends on the context. It may mean a departmental workgroup, a department or an entire company. The escalation-permissions-to-all approach has its own drawbacks. Firstly, the trust model on the document is different (typically much wider) than the trust model of the email thread. This means the mental trust model the users have to apply is different than they apply to inline attachments. This can have a high cognitive overhead discouraging use and furthermore breaks the paradigm of a traditional email that only users on the email have access to all content of the email. Secondly, as the notion of "all" expands, such as for example from workgroup to departmental to whole company, the centralized document management system becomes increasingly unwieldy. It becomes increasingly difficult to organize the system. It also becomes increasingly likely that unauthorized users will update a document (maybe mistakenly) that they should not have. Unfortunately, any attempt to bring the document sprawl under control by applying permissions re-introduces the very problem that the 'escalate-permissions-to-all' approach was meant to solve. Thirdly, the 'escalate-permissions-to-all' approach does not work when the document is meant to be private to the participants on the email thread. Finally, unless 'all' is defined to mean any possible user in the world, there is always a 'bigger all' where the system breaks down. For example, if 'all' is defined as a departmental-level shared document store, then emails between two departments (that reference a shared document) don't work. If 'all' is defined as a company-level shared document store, then emails between two companies don't work.

Immutability Problem: The second major problem that these shared document systems introduce is that they break another fundamental assumption of email. A fundamental assumption of email is that once an email is sent, it is immutable (does not change). With these shared document systems the link in the email typically points to the latest version of the document. This means that when the document is changed, emails that have already been sent are conceptually changing (since the document they point to is changing). One possible solution to this problem is for the document management system to itself be versioned and have the ability to reference particular versions of the shared document. Now, instead of passing a link to the document the users can pass a link to a particular version of the document. This approach solves the immutability problem but relies on user discipline to be always sending a link to the correct version of the shared document. It also makes the whole system (email+versioned document system) increasingly complex and undermines one of email's great virtues (i.e., simplicity). This level of discipline and complexity is impossible to manage for typical users. Further a single user "messing up" undermines the whole scheme. Once again this means that users cannot rely on this behavior. Systems attempting to do this automatically are unworkable because there is no way to know whether a new version should be created or an entirely new document be created via copy in a traditional email system.

Inconsistency Problem: The final problem with the shared-document-in-the-middle system is that the documents can (and typically will) be out of synch relative to each other as well as relative to the email thread. Imagine a thread with several documents 'in the middle'. There is no way to modify two or more documents in a consistent manner. For example, consider an email thread related to a sales cycle. Now let's say there are two documents 'in the middle'. One, a document with a list of 'key dates' related to the sales cycle and two, a list of 'key competitors'. Now suppose a competitor drops out, which in turn causes the key dates of the sales cycle to change. If the 'key competitors' document is updated first it will be out of synch relative to the 'key dates' document. Also, when a document is updated, this has no impact the email thread. For example, the competitor that dropped out may have been 'Acme Corporation' and the most recent message in the email thread may have been 'Acme is the biggest threat to us'.

In general, document-in-the-middle approaches have massive consistency problems, both between the shared documents as well as between the shared documents and the email thread.

For the aforementioned reasons, the 'email+shared document system' paradigm typically creates more problems than it solves. It violates the underlying assumptions of email while creating an entirely different conceptual system compared to the ostensible system it is replacing (inline attachments). It also introduces a massive new set of inconsistencies in the process of overcoming the inconsistencies of the inline attachment approach.

Another approach that is possible in theory is to dump email altogether and just use a document collaboration system. There are some severe drawbacks to this approach as well. Firstly, a doc-first approach is not a natural way to think about communication. If one thinks about how email threads evolve they may start with no attachments and then optionally add one or more attachments organically as the thread evolves. Additionally, doc-centric systems treat each document independently. Again this is different than email which treats the attachments as a group. Most importantly, email is a way to release information in a user-controlled manner (i.e., a message). Doc-centric systems either continuously release information or sometimes on "save" or sometimes on some arbitrary "auto-save". None of these approaches allows users to control precisely when a batch of information gets released (i.e., a message). Finally, doc-centric systems need to be checked periodically to see what's new. There is no inbox metaphor which is so critical to a messaging system like email. Of course they could provide notifications via email. Leaving aside the lack of precise control over the information batch, this again re-introduces the two-incompatible-system-problem mentioned at the start of this section.

For these reasons the 'email+doc-centric system' and the 'doc-centric-only system' approaches are both highly flawed as replacements for email. This explains the continued popularity of email as a general collaboration tool despite its significant flaws.

The present invention merges the concept of a traditional email system with the concept of updateable inline content. It does this while retaining the well-understood inbox metaphor of email as well as the trust and immutability model of email. Additionally, it does not introduce permission and version inconsistencies between the email system and its inline content.

The present invention introduces the notion of updateable content sections. The updateable content sections can be of various types, such as text sections, grid sections and file sections, and the like. Any user on the discussion thread can access the section. Also, no user that is not on the discussion thread can access the section. There is one permissions list that governs both the messages as well as the updateable sections. This means that there is no need to try to keep the permissions in synch and therefore there is no "permissions problem." A key aspect of this is the ability for the user to be able to indicate whether they want to "reply within" or "reply outside." The former will update shared content, add a comment, increment the latest version number and deliver messages. The latter will fork the TAMM and create a new TAMM with a different set of permissions. "Replying Within" automatically places constraints on changing of the user list on the TAMM.

Furthermore, according to the present invention, a particular message automatically refers to the version of the section at the point in time that the message was sent. There is therefore no "immutability problem."

If the section is not the latest version this is clearly indicated and the section is not updateable. However, the user can switch to the latest version with a single click and edit the section. In this manner the user can always know what the latest state of the section is and also ensure that they are editing the latest version. Furthermore, the user can at any time see the full audit trail of a section. This eliminates attachment problems existing in traditional email system known in the prior art.

Multiple updateable content sections as well as the discussion thread itself can be modified in a consistent, atomic manner. Without limitation, some of these content sections may be files and it is therefore possible that multiple files will need to be modified in a single atomic transaction. Updating multiple updateable content sections is accomplished using a TAMM private clone object, but is not a TAMM itself. A private clone object is not a TAMM because (i) messages are not sent when the object is modified and (ii) it is a non-shared object private to a single user. A private clone is a clone of an existing TAMM, cloned at a particular version number of the TAMM. This version number is referred to as the root version number. For example, if the TAMM is private-cloned when the TAMM is at version #4, the root version of the private clone object will be version #4. A private clone object is so named because it is private to the user making the clone. The cloned TAMM is referred to as the parent TAMM. In the private clone object, the user can update one or more updateable content sections, add to the user list, and add a comment. As a user is editing the private clone object, it is possible that someone else updated one or updateable content sections in the parent TAMM in the process of adding a comment and sending messages. The present invention indicates to the user in the private clone object, the differences between the parent TAMM content sections and the private clone object content sections. Updateable content sections may be unmodified (−), created (+), updated (*) or deleted (X) in the parent TAMM or private clone object. Accordingly, without limitation, the following eleven combinations of modification indicators are noted on a per-section basis (parent TAMM modification indicator, private clone object modification indicator) (−, −) (−, *), (−, X), (*, −), (*, *), (*, X), (X, −), (X, *), (X, X), (+, not applicable), (not applicable, +). Of these, (*, *) is considered a conflict. The remaining combinations are considered non-conflicting. According to another embodiment, (*, X) and (X, *) are also considered conflicting. When the user who owns the private clone object, is ready to send his message, the system detects if there are any conflicts as described above. If not, then all the updated, created and deleted sections are updated, a comment is added, latest version number is incremented and messages are sent and the private clone object deleted in a single atomic transaction on the parent TAMM. In this manner, multiple updateable content sections can be modified in a single atomic transaction. If there is a conflict, then the user is warned of the conflict and can choose to ignore the warning and overwrite changes on the parent TAMM. Alternatively, the user may be presented with a merge user interface which may be utilized to merge the content of a conflicting section on the parent TAMM with the content of a conflicting section on the private clone object. Once this merge is complete, the system changes from conflicting (*, *) to non-conflicting (−, *). Now the user can send his or her message in a single atomic transaction as described earlier. With this approach, the present invention improves on the state of the art for collaboration existing in traditional email systems. This is accomplished without sacrificing the ease of use of email or violating any of the key underlying assumptions of email.

The system also supports a coordinated collaboration approach that is often needed for more complex collaboration. In a coordinated collaboration approach one user is responsible for managing the state of the TAMM, while other users give make suggested modifications that the Coordinator can choose to incorporate in whole or part or not at all. In order to support coordinated collaboration, the system also supports the concept of certified clone TAMMs. The coordinator who is responsible for managing the state of the TAMM (referred to as a parent TAMM in this context) creates a certified clone TAMM. When a certified clone TAMM is created, the system transactionally guarantees that the certified clone is a consistent copy at a particular version of the original TAMM. The version of the parent TAMM at which the certified clone is made is called the root version. When the coordinator creates the certified clone, he can create it with a potentially different set of users. The guaranteed common user between the two TAMMs is the coordinator, though in specific situations there may be additional common users. Because the certified clone TAMM has identical copies of updatable content sections as the parent TAMM at the root version, the coordinator as well as the other users on the certified clone TAMM can effectively perform a difference operation between the latest version of the certified clone TAMM and the root version of the parent TAMM by performing a difference operation between the latest version of the certified clone TAMM and the original version of the certified clone TAMM. This is important because (in general) users on the certified clone TAMM are not users on the parent TAMM. By seeing this difference, the coordinator can merge changes from the certified clone TAMM into the parent TAMM. If more than one section needs to be merged, the coordinator will make use of a Private Clone of the parent TAMM in order to achieve this. This capability essentially allows private editing of content by different subgroups but with the support to allow a coordinator to systematically merge those changes back in a single atomic transaction.

Official Business

Traditional email systems have some major drawbacks for conducting 'official' business. Official business is defined as any process where the credibility and accuracy of the email is important. For example, it may be the sending of an order to a vendor or a stock option grant to an employee or the collaboration between a doctor and pharmacy on a prescription or a contract negotiation. In all of these scenarios the accuracy and credibility of the system of communication is paramount.

Traditional email systems have design characteristics that are problematic with respect to official business. For example, traditional email systems provide no guaranteed delivery, no reliable protection for spoofing one's identity or content, no reliable audit trail, and allow for plausible deniability The present invention overcomes these problems. When a TAMM is 'sent' both the sender and receiver can confidently assert and prove that it was sent and delivered. Further, the content of forwards and replies is certified. Users can confidently assert and prove that the content in the forward or reply is accurate. Binding agreements can be made using TAMM that cannot be spoofed or repudiated. The identity of users cannot be spoofed or repudiated. The timestamp of the TMail is also certified and cannot be spoofed or repudiated. The audit trail of a TMail is certified and cannot be spoofed or repudiated. The content of a TMail is certified and cannot be spoofed or repudiated. Difference is content between different versions of the TAMM are also guaranteed (Certified Differences).

By relying on these characteristics of TMail, businesses can conduct more types of business over TMail (compared to email). Furthermore, even for business currently conducted via email they can rely on these characteristics to improve the reliability and robustness of their communications.

They can do this without building or utilizing highly specialized collaboration systems (such as contract management systems). One of nice characteristics of email is that it is a general purpose tool used in many different contexts. Specialized tools are expensive to build and maintain. They tend to be much more expensive. They also tend to be utilized much less because they have narrower uses.

By providing characteristics that enable official business in a general purpose tool, TMail vastly expands the types of business or processes that can be conducted relative to email. Some examples of such processes include but are not limited to communication with law firms and lawyers, communication with government entities, "official" intracompany communications, business transactions (orders, invoices, prescriptions etc.) and contract negotiations.

Addressability

Unlike a web page or a document on a file system an email is not addressable. This means that there is no way to refer directly to an email. For example, say, Joe sent Jill an email on Monday. On Tuesday, if Joe wants to discuss this email there is no way to directly reference it. He can say 'It was an email I sent yesterday with a subject of "Interesting Subject." Then Jill can go and search for that email. Alternatively, Joe could re-forward the email to Jill. If Joe wants to refer to this email from some other system (text message, Excel document, phone call, voice mail, ERP system etc.) once again there is no way to directly do so.

It is estimated that 80% of the content that people generate in businesses is in the form of email or attachments in email! And yet, there is no way to directly refer to this huge amount of content!

Just like the hyperlink transformed the Internet into the web as we know it. Email could be transformed if messages could be directly addressed.

TMail enables addressability by giving each TMail a globally unique identifier (called a TMail Number). A TMail Number looks something like 024-0025-0062. TMails can be referred to by using this number. This number could be texted, placed in an Excel document, mentioned in a phone call, left on a voice mail or stored in an ERP system etc. TMails can even refer to each other via this number.

The number has been designed to have a fixed chunking (like a phone number) for easy human comprehension. This is unlike, say, some 40 digit, non-chunked hexadecimal number or complex URL.

This addressability of TMails could potentially be as transformational for email as the hyperlink/web was for the Internet.

The addressability of a TMail is different than the addressability of shared documents in a document-in-the-middle approach. In this type of system, the entire communication which includes the comment thread and content sections is addressable.

Spam

One of the major problems with traditional email systems involves spam. Spam has many detrimental effects. It can overwhelm your inbox leading to a lower signal-to-noise ratio. Spam filters can work but they can also cause non-spam messages to be sent to one's Junk folder. Spam can act as a vector for viruses and phishing attacks. Traditional email systems is susceptible to spam for several reasons. There is no certified identity in email. This means that spammers can quickly change identities to stay one step ahead of spam filters and the authorities. Further, the incremental cost to send an email is basically zero. This means that spammers can (and do) send billions of emails at a very low cost.

The present invention overcomes this spam problem. Identity is certified. This means that spammers that violate terms of service can be more easily tracked down. TMail will require email marketers to register a credit card along with their identity. Further, unlike traditional email systems, the present invention makes a distinction between human users and bot users. These two types of users have distinct icons that other users can readily identify. More importantly, human users are limited to a pre-defined number of free messages per day (e.g., 500). This will be more than enough for any legitimate purpose. Bot users will be able to send any number of messages. However, bot users will be charged a micro-transaction cost. This micro-transaction cost will discourage indiscriminate creation of spam. The flip side of spam is email marketing. Email marketing is a legitimate business. However, because there is no cost to email, there is an incentive to send huge quantities of email.

In TMail, the balance between spam and legitimate marketing is maintained by a market-driven calculation of micro-transaction costs. Each user has a predefined and configurable finite number of sponsored TMails that they can receive per day (e.g., five TMails per day). Based on the market demand and (finite) supply for each user a price will be established for each user. For example, the micro-transaction cost of reaching Joe Six-pack may be $0.01/message. However the micro-transaction cost of reaching Warren Buffet of Omaha, Nebr. may be $200/message. In a sense the finite attention of specific users is being auctioned off. This market-based cost of attention will be able to strike the right balance between spam and marketing. Additionally, by varying the attention cost on a per-user basis it incentivizes marketing messages to be highly relevant. For example, a marketer paying $200 to send a message to Warren Buffet would highly tailor the message in order to achieve an ROI on this message. This is a similar mechanism to how Google AdWords incentivizes relevancy. The distinction with TMail is that this relevancy differs based on the specific user being targeted.

Task Management

Traditional email systems have become the default task management system for many people and companies. One reason for this is the ubiquity and simplicity of email. There are many specialized task management systems. However, these tend to be used in highly verticalized domains such as help desk management, defect tracking systems, and the like Variants of tasks include tasks, requests, defects, issues, and the like. Most of the specialized systems create tasks in the context of "projects." This means that that the "projects" need to be first set up and managed which requires significant overhead. Said another way, email tasks are person-to-person whereas most task management systems are person-to-project-to-person.

Tasks in traditional email systems have many downsides. Because of the nature of email, it is unclear what the true latest state of the task is. Also assignment of tasks tends to be very ad-hoc and inconsistent. Despite this, with the aid of read/unread flags and the application of labels, most people tend to use email as their default task management system.

The present invention provides better support for task management. It preserves the powerful person-to-person metaphor of email task management. TMail is not designed for the person-project-person metaphor. Because of the nature of the "base" described above, the true latest state of the task is known and updateable. The present invention also includes the concept of TMail types. Task TMail types introduces the first class notions of the state of the task, who is the requester and who it is assigned to. It does this without changing any of the other assumptions of TMail. In other words a Task TMail is a TMail with a few additional attributes. Finally, the "folder" system is significantly revamped compared to email. Instead of an Inbox and then various folders or labels, all TMail messages go through a message flow. This message flow consists of the following stages: Main→Backlog→On Deck→In Progress→Archive. When messages first arrive they appear in the main 'folder'. Users can then advance the message through the flow till the message is archived. Messages can be moved out of sequence as well as moved backwards.

User-Defined Templates

The present invention supports user-defined templates. Templates vastly expand the 'structured' processes and 'form-based' processes supported in TMail. For example, a user can use the present invention to create an order template. The order template might include an order header section and an order lines section. The order header section might also include attributes such as order number, delivery date, delivery address, and the like. The order lines section might include a table of order lines with attributes such as line number, item number, item description, quantity, price, and the like. Once the order template is created, other users might instantiate the template into a new TMail and complete the details. According to one embodiment, because updateable content sections may be structured (e.g., may have user-defined attributes), all TMail's instantiated from templates without limitation will have the same set of user-defined attributes. Every template has a globally unique name which was given by the user that created the template. Every updateable content section has a unique section name or number and every attribute within an updateable content section is unique within a particular version of the template. This means that an attribute can be uniquely defined as <Template Name>.<Template Version>.<Updateable Content Section Number>.<User-Defined Attribute Name>. In addition to indexing standard attributes of a TMail, the present invention also indexes user-defined attributes. This allows for creation of structured searches across TMail instances from a particular template which is a capability missing from email. This capability enables lightweight business processes to be run in TMail.

Referring to FIG. 1, a block diagram illustrating an attempted collaboration model using traditional email known in the prior art is shown. In this example, a user 110 initiates a communication exchange by sending a set of duplicate email messages 130 to prospective participants 120*a*, 120*b*, and 120*c* to inform them of the start of the collaboration. The participants 120*a*-*c* generally respond with separate email messages 140*a*, 140*b*, and 140*c* including information about availability, attendance, etc. Each of the messages 140*a*-*c* is a distinct and unique entity, and none of the messages 140*a*-*c* bear any programmatic relationship to each other nor to the original message 130. The user 110 (the party organizer in this example) manually collates the responses to determine who is coming and who is not. In a further example, assume that the proposed time or date is not acceptable to all. In this example, the users 110 and 120*a*-*c* may send further messages 150 and 160 between themselves. Note that with each new message that is sent out, the amount of "noise" in the system from potentially conflicting information increases. In extreme cases, continuing the collaboration may in fact create more confusion and uncertainty about the party because there is no single definitive source of information.

Another example of collaboration using a traditional email system is the joint creation or revision of a document. Again with reference to FIG. 1, user 110 and participants 120*a*-*c* are authors of the document, and interact to produce on a single conceptual work that is the result of multiple authors. Using email, this collaboration typically involves the various authors emailing copies of the document back and forth with new revisions, represented by the messages 130*a*-*c*, 140*a*-*c*, 150 and 160. Because email is message-oriented, each revision creates a new copy. This not only wastes storage space, but also uses the authors' time and effort to manually reconcile the various versions and avoid dropping revisions.

Some embodiments of the present disclosure refer to a specialized type of collaboration, called commerce. Email can be used to send invoices and orders, negotiate contracts, and communicate between businesses and customers. As with other types of collaboration, email is used because of its ubiquity and ease-of-use. Other solutions (such as EDI) are non-ubiquitous, specialized and highly complex, putting them out of reach of all but the biggest organizations.

Unfortunately, the nature of email presents legal, technical, and business difficulties when used for commerce. First, email does not provide an authoritative audit trail. While it is possible for independent parties to keep their own audit trail, the copy-oriented nature of email makes it is difficult or even impossible to prove that any single party has a complete record of the exchange. However, legal requirements such as the ones imposed by Sarbanes-Oxley may require authoritative audit trails that cannot be altered, as well as issue tracking and participant verifiability. None of these can be provided reliably through email. Therefore, many documents that need to have legal effect cannot be transmitted over email; paper or facsimile copies must still be exchanged, increasing complexity, storage cost, and time.

Second, email messages can be spoofed, edited, or otherwise injected into the exchange by malicious parties. Even in carefully controlled networks, the inherent exposure of email systems to attack creates business risk and puts legal verifiability in question. As networked commerce becomes more prevalent, the risk of using email will increase, especially when negotiating large or important transactions.

Third, email is lacking important Quality of Service (QoS) guarantees. There is no provision for guaranteed delivery of an email message, nor is there the ability to guarantee that a particular series of messages will be delivered in a particular order. Unreliable email can reduce sales or cause damage to a business' reputation if exchanges with customers are lost, misdirected, or mishandled. In the context of a collaborative effort, poor QoS may result in version clash—when multiple incompatible versions of a document exist without any simple way of reconciling the contents.

Fourth, email is not addressable. Email cannot be referred to across or even within some systems. Therefore, users frequently resort to poor substitutes for message addresses, such as date stamps within the email, version numbers in the title, and statements within the message itself. This presents a particular problem in commerce when one statement (such as an invoice) needs to refer to another statement (such as an order). Accurate message linking is difficult enough that the current state of the art is to inject metadata (such as tracking numbers) into the body of the message to improve the accuracy of heuristic systems. However, the injection of metadata into the email is error-prone and insufficient, especially when several distinct message threads need to unambiguously refer to a single upstream message.

Fifth, the easy automation of email systems without corresponding controls has led to a massive increase in "SPAM"—unsolicited commercial email. Recent advances (such as DomainKeys, SenderID, certified email, etc.) have attempted to address this problem, but the email system as currently architected is vulnerable to abuse. The resulting flood of spam costs money both in terms of network and processor load as well as operator time. Further compounding this problem is the ability, mentioned above, for email to be spoofed; spammers regularly modify their email messages to disguise their origins.

Because it is difficult for email to handle these seemingly simple collaboration and commerce challenges, specialized services have evolved to address use cases for which email is unfit. However, the creation of more and more specialized services to address specific uses cases imposes costs of its own. Businesses lose the ubiquity of email and must deal with the inevitable friction of multiple systems working in subtly or wholly incompatible ways.

I. System for Transactional, Addressable Communication

Figure 2A:
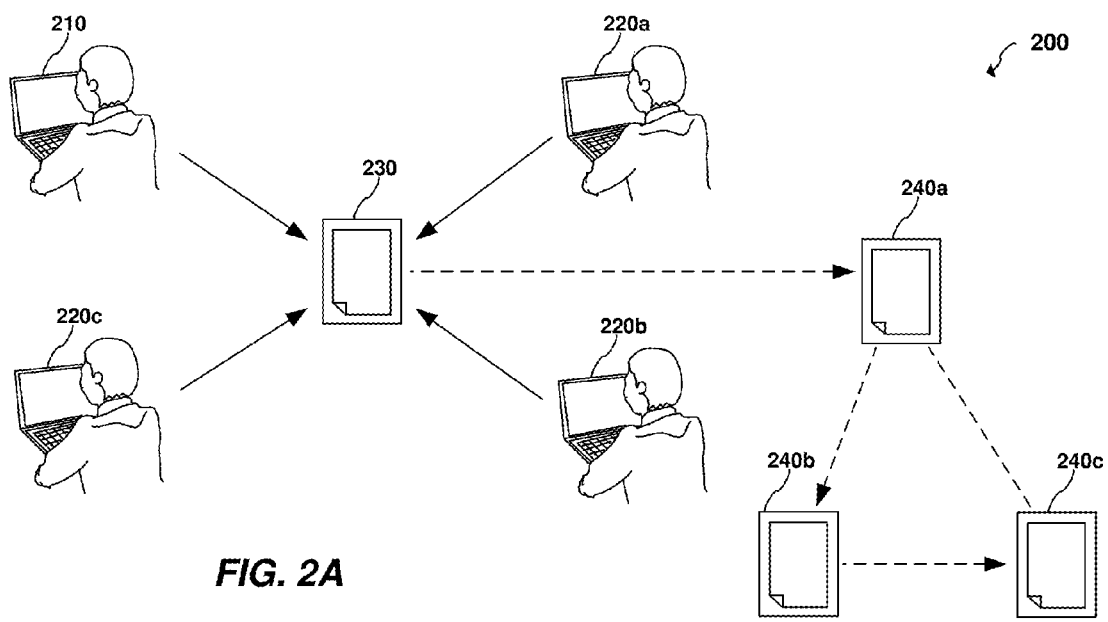
FIGS. 2A-2C are block diagrams illustrating a system for managing transactional, addressable communication in accordance with an embodiment of the present invention.
Figure 2B:
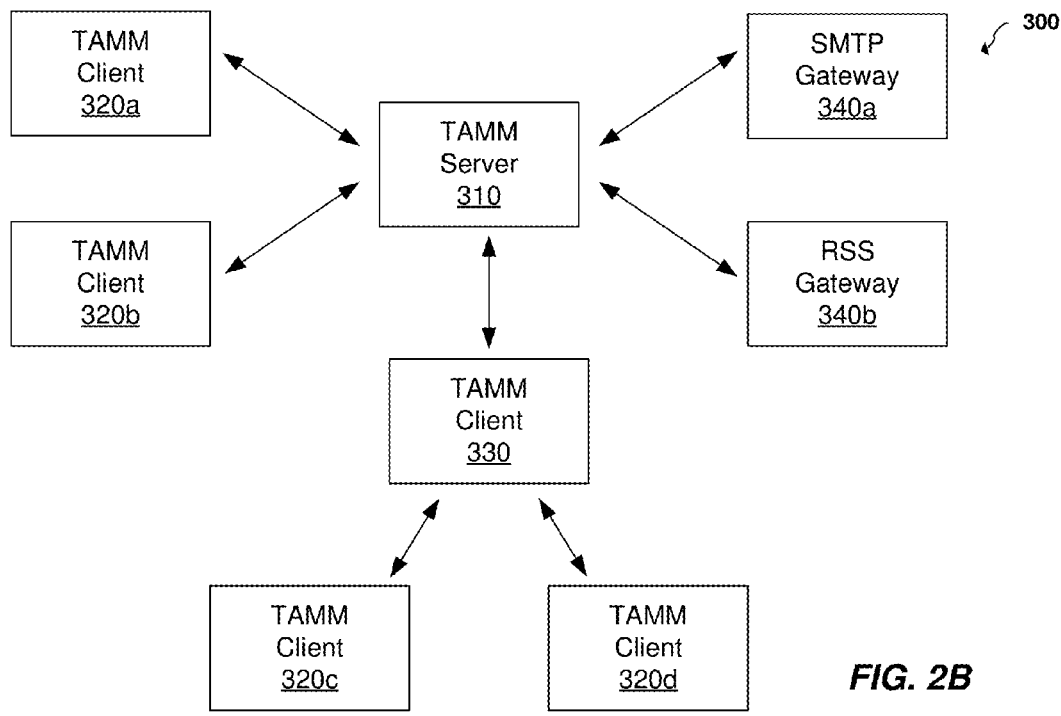
Figure 2C:
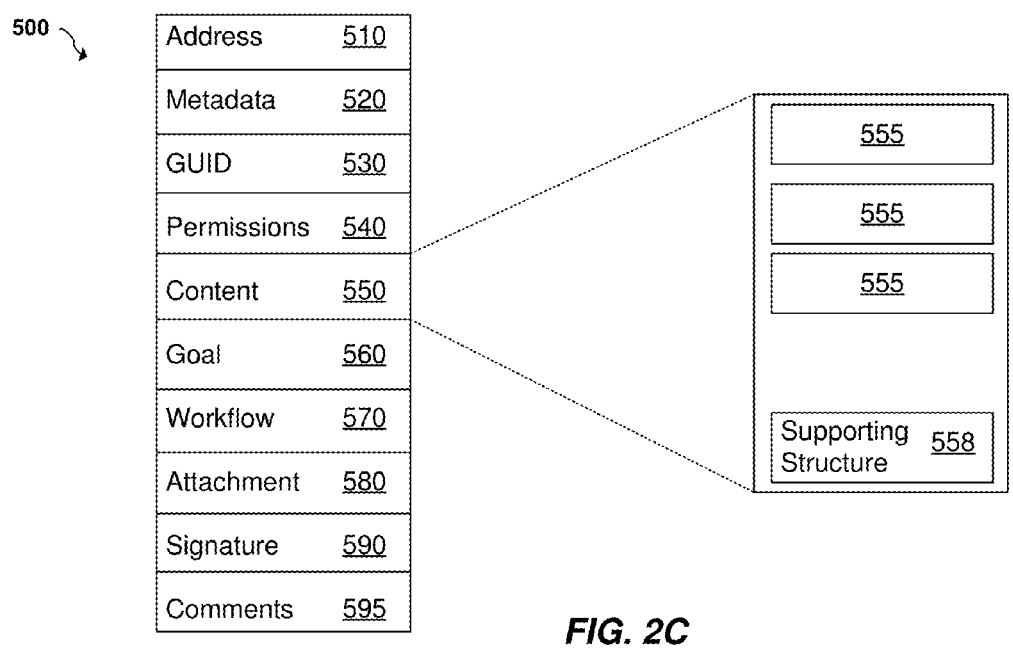

Referring to FIGS. 2A-2C, block diagrams illustrating a system for managing transactional, addressable communication in accordance with an embodiment of the present invention, are shown.

Referring to FIG. 2A, various embodiments in the present disclosure provide a transactional communication system with addressable component parts are shown. As used herein, various legacy systems are referred to as email systems and messages, and various embodiments of the present invention are referred to individually and collectively as "TAMM" Systems (transactional, addressable mail message, or transactional, addressable mail messaging systems). However, it is understood that each embodiment of a TAMM is separate unless two or more embodiments are specifically linked. Returning again to the collaboration model illustrated above, user 210 wants to collaborate with users 220a-c. Instead of sending multiple copies of the same email, however, a single authoritative object—the TAMM object (or simply TAMM) 230—is created. In one embodiment, the TAMM 230 exists at the site of user 210's TAMM client; the client software or hardware contains modules allowing it to provide TAMM service and storage as well as the ability to read or manipulate the TAMM. In another embodiment, a separate non-client TAMM server is shared between the different participants. In a third embodiment, different parts of the TAMM are associated with different users' TAMM clients; the TAMM system associates the different portions of the TAMM over the network to present a unified interface to each participant. When each user wishes to engage in the collaboration, the joint TAMM is updated with each person's contributions, subject to constraints and permissions more fully described below. If additional pieces of information are needed in the collaboration, other TAMMs 240a-c can be created and linked to the original TAMM 230. In this embodiment, different conceptual pieces of work can be bound together while still preserving an authoritative shared repository.

To better illustrate the advantages and features of various embodiments, a particular description of several embodiments will be provided with reference to the attached drawings. These drawings, and other embodiments described herein, only illustrate selected aspects of the embodiments and do not limit the scope thereof. Further, despite reference to specific features illustrated in the example embodiments, it will nevertheless be understood that these features are not essential to all embodiments and no limitation of the scope thereof is thereby intended. Possible alterations, modifications, and applications of the principles described herein, such as would occur to one skilled in the art, have been omitted for clarity and brevity; nevertheless, it is understood that such alterations, modifications, and applications are contemplated. Some items are shown in a simplified form or are illustrated as being in direct connection for the sake of simplicity. Despite the apparent direct connection, it is understood that such illustration does not preclude the existence of intermediate components not otherwise illustrated.

For further clarity, some embodiments may use computing "modules" in their implementation. A computing module is a piece of hardware or software that can store data, process instructions, or respond to inputs. A module may be general-purpose or it may have dedicated functions such as memory management, program flow, instruction processing, object storage, etc. Modules can be implemented in any way known in the art. For example, in one embodiment a module is implemented in a hardware circuit comprising custom VLSI circuits or gate arrays, off-the-shelf semiconductors such as logic chips, transistors, or other discrete components. One or more of the modules may also be implemented in programmable hardware devices such as field programmable gate arrays, programmable array logic, programmable logic devices or the like.

In another embodiment, one or more of the computing modules are implemented in software for execution by various types of processors. An identified module of executable code may, for instance, comprise one or more physical or logical blocks of computer instructions that may, for instance, be organized as an object, procedure, or function. Further, the executables of an identified module need not be physically located together, but may comprise disparate instructions stored in different locations that, when joined logically together, comprise the module and achieve the stated purpose for the module. A "module" of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set or may be distributed over different locations including over different storage devices, and may exist, at least partially, merely as electronic signals on a system or network.

Another embodiment uses higher-level components as modules. For example, a module may comprise an entire computer acting as part of a larger system. A module may also comprise an off-the-shelf or custom program, such as a database management system. These higher-level modules may be decomposable into smaller hardware or software modules corresponding to different parts of a software program and identifiable chips (such as memory chips, ASICs, or a CPU) within a computer.

Referring to FIG. 2B, one possible non-limiting implementation of the present invention is shown. According to this implementation, the TAMM system 300 includes a TAMM server 310, TAMM clients 320, a TAMM client-server 330, and one or more gateways 340. Module 310 is a TAMM server that provides storage for one or more logical collections of non-duplicated shared messages (TAMMs). The one or more shared objects are stored on the TAMM server 310 such that only one copy of each TAMM exists for multiple parties without duplication (i.e., the message conversation which may be associated with multiple threads (such as replies/responses to the original message) is shared without duplication of any portion of the message conversation) regardless of the whether the shared message content is modified by one or more of the multiple parties. Specifically, any updates to a shared object is made directly to the non-duplicated shared object and is visible to all relevant parties (i.e., any changes to the shared message content is persistent). According to one embodiment, the TAMM Server 310 which acts as an intermediary between TAMM clients 320a-320d to provide a transactional, addressable message over a network.

In one embodiment, the TAMM Server 310 comprises a database module, a network publishing module, and one or more interpreter modules. Clients communicate with TAMM server 310 either via an internal (same process), system-level (same system), or network-level API in order to provide access to the one or more shared messages. In one embodiment different capabilities are available at different API levels. On a network level, one embodiment uses an enhanced SMTP to transfer TAMM messages and references. Another embodiment uses HTTP as a transport and defines one or more access protocols (such as WebDAV) on top of HTTP. In a third embodiment, a special-purpose protocol is used to communicate between different parts of the TAMM system. A fourth embodiment "tunnels" TAMM information through another protocol. Although a classic client-server architecture is illustrated, n-tier systems are also contemplated.

Modules 320a-d are TAMM clients. In one embodiment, these clients are traditional software programs. In another embodiment, these clients are libraries or modules that other programs or modules call into to interact with the TAMM system. In a third embodiment, all or part of a client module 320 is delivered over the network. One embodiment of a client module is discussed in more detail below.

The module 330 is a client-server module. In one embodiment, this module serves as a "bridge" server, proxying requests back to the TAMM server 310. In another embodiment, the module 330 acts as a full server. The client modules 320c and 320d may or may not be aware that the client/server module 330 has a connection with another TAMM system. In a third embodiment, only part of the TAMM system service is "served" from the client/server module 330. Rather, the module 330 acts as a tracker, describing the location of various parts of the TAMM and directing how the component parts can be assembled logically into a single cohesive unit.

The modules 340a and 340b are gateways, allowing interoperability with outside systems, particularly email systems. Module 340a acts as an SMTP gateway, taking TAMMs and formatting them as compliant email messages. In one embodiment, this formatting is lossless, and the TAMM is able to tunnel through the SMTP system into another TAMM-compliant system. In another embodiment, this transformation is lossy, and an email representation of the TAMM is created, but programmatic links with the TAMM are lost. In a third embodiment, a "reference" email is created, which email notifies the receiver that a TAMM has been created and invites him or her to log into the TAMM system to view and interact with that TAMM. Module 340b acts as an RSS gateway, allowing notifications via paging over HTTP and web-based interaction.

Referring to FIG. 2C, various parts of a TAMM are shown. In one embodiment, the different parts of a TAMM are never stored as a contiguous unit; rather, they are brought together into a logical unit through logical association, linking, joining, or other processes. In a second embodiment, the TAMM is stored as a single file in a specific format. This format could be a superset of the RFC 2822 and 2045 standards that define Internet message formats and MIME attachments. In one embodiment, for example, the information could be included by adding extra headers or specialized MIME attachments that would be preserved (but not interpreted) by email clients and email systems. The format could alternatively be a vender-specific textual, tagged, or binary format. In a third embodiment, different TAMM formats could be transparently used within the same system to promote interoperability with email systems and clients while still providing advanced functionality to TAMM-native clients. In a fourth embodiment, TAMMs are stored as rows in joined tables in a relational database.

It will be appreciated by those skilled in the art that a TAMM can be instantiated as an email, and some embodiments of TAMM can define the functionality of a TAMM system as a strict superset of the functionality of existing email systems. Further, an embodiment can define a TAMM format so that TAMM-specific information is passed through traditional email systems intact. In another embodiment, email is used as a TAMM notification mechanism, and specialized links associate the content of an email with a specific TAMM. In embodiments where interoperability with email has been established, some or all of the functionality of email is reproduced—including the advantages of ubiquity and familiarity. Thus, in some embodiments, a TAMM address can be used interchangeably with an email address. Unstructured interactions, such as those using email, are available with the same ease-of-use as in existing systems. At the same time, however, the higher structure of the TAMM allows interactions not previously possible with email.

Continuing with FIG. 2C, one embodiment of TAMM contains an address section 510, a metadata section 520, a globally unique ID (guid) 530, a permissions section 540, a mutable content section 550, a goal section 560, a workflow/application section 570, an attachment section 580, a signature section 590, and a comments section 595. Other embodiments may use different sections. For example, one embodiment adds an "attachment" section. Another embodiment allows user-defined sections for use in specialized TAMM interactions. Also, not all sections are required for each TAMM—some sections may be optional or have system-provided default values.

The address section 510 contains references to one or more recipients. These recipients will receive notification of the TAMM and may have permission to modify, link to, see, or otherwise access the TAMM. In one embodiment, the recipients are identified by TAMM addresses or by other URIs. In another embodiment, no-recipient TAMMs are allowable and can be used by their author to track the status of other TAMMs or groups of TAMMs. In a third embodiment, the address section can contain references to other TAMMs—i.e., a TAMM can itself be the recipient of a message. In a fourth embodiment, the address section contains references to addresses without holding the addresses themselves, allowing the TAMM addresses to be opaque to a user or author. In a fifth embodiment, the address section holds addresses or references to groups of users. A sixth embodiment uses the concept of logical databases. Logical Databases are "spaces" where TAMMs can be directed to allow them to be accessed as a group by any member of the logical database. For example, all task TAMMs may be directed to a "Project" logical database where they can be dealt with collectively. A seventh embodiment allows two or more different types of recipients in the address section.

In one embodiment, each recipient in the address section is linked to a unique identity. The authentication of participants can be scaled to allow different types or levels of privilege depending on the quality of the authentication. For example, Sarbanes-Oxley compliance may require participant verification. A TAMM could require authentication of a recipient to fulfill that requirement. Alternatively, authentication could be used to enforce rules concerning unwanted distribution of SPAM while still allowing programmatic access and automation of the TAMM system.

The metadata section 520 contains metadata about the TAMM, including an optional subject. The information in the metadata section does not necessarily need to be hard-coded; one embodiment has active content in the metadata section to modify the metadata in response to changes in the current TAMM or one or more linked TAMMs. Many different types of metadata can be contained within the metadata section. Depending on the embodiment, this metadata may be key-value structured, table-structured, or tree-structured. The metadata section may also include interpretation information to aid TAMM clients in the interpretation of application-specific and custom TAMM types.

The guid 530 allows each TAMM to be individually addressed. In one embodiment, each TAMM client has a designated number range within the TAMM space defined by 0.2.sup.128. The system assigns each TAMM a number serially from within the range. In another embodiment, the guid is generated using TAMM-client-specific, machine-specific, and time-specific data. In a third embodiment, each guid 530 is a unique URI. With the URI space, different URIs could refer to different levels of the TAMM infrastructure. In one exemplary embodiment, global TAMMs are referred to via a URI [http://node.com/gTAMM/<logical database number>/<TAMM-number>], and organization-centric TAMMs are referred to via a URI [http://node.com/oTAMM/<org number>/<logical database number>/<TAMM-number>].

Different embodiments can use the guid 530 to provide services within the TAMM system. For example, one embodiment uses the guid to provide unambiguous threading and linking between TAMMs. Another embodiment uses the guid to make each TAMM reachable over the web. A third embodiment uses the guid to make archiving and retrieving TAMM fine-grained and exact. A fourth embodiment uses the guid to link TACs (Transactional, Addressable Chats) to a temporal schedule. A fifth embodiment uses the guid to create a shared, authoritative audit trail.

In one embodiment implementing an audit trail, each guid 530 in a particular exchange is part of a cryptographic message hash. Only the correct content in the correct order can produce an equivalent hash value. In another embodiment, each guid is a key in a multi-key signing system, with each message being signed and possibly encrypted using the guids from previous TAMMs in the exchange. The participant's keys can also be optionally included. In this embodiment, only the participation of each principal as well as the inclusion of each TAMM in the exchange, in order, can successfully reveal or authenticate the most recent TAMM message.

The permissions section 540 contains security information concerning the content of the TAMM and the links contained therein. In one embodiment, this security information takes the form of capabilities. Each individual part of the TAMM is defined to have certain capabilities as defined in the literature; security can be implemented as a reachability constraint or via the presence or absence of tokens.

In another embodiment, the security information takes the form of ACLs that can be edited by the author and those to whom the author grants ACL editing permissions. Users that have access to one TAMM can be allowed to access a related TAMM through a special grant of privilege. This grant can be non-transitive in nature.

In a third embodiment, the permissions section 540 contains role information. A role-based system is a system in which identities and resources are managed by aggregating them into "roles" based on job functions, physical location, legal controls, and other criteria. These roles can be used to model organizational structures, manage assets, or organize data. By arranging roles and the associated rules into graphs or hierarchies, these roles can be used to reason about and manage various resources.

Role-based strategies can be used in the context of a security model called Role-Based Access Control (RBAC). RBAC associates special rules, called "permissions," with roles; each role is granted only the minimum permissions necessary for the performance of the functions associated with that role. Identities are assigned to roles, giving the users and other entities the permissions necessary to accomplish job functions. This presents a flexible approach while still maintaining separation of duties concepts important to real-world security. In one TAMM embodiment, roles, organizations, and identities are all first-class objects within the TAMM manipulable by the TAMM system.

In a fourth embodiment, the permissions section 540 is part of a public key infrastructure (PKI) system; the security of any individual part of a TAMM is predicated on being able to decrypt and interpret that part.

In a fifth embodiment, the type of the TAMM (as discussed below) defines certain permissions over different parts of content. For example, an "accept" permission may make sense in one type of TAMM, but not in another. The permissions section 540 is flexible enough to allow the definition of new permission types upon the creation of a TAMM.

The mutable content section 550 contains one or more content blocks 555 and optional supporting structure 558. In one embodiment, each TAMM contains a single block of content 555, as in current email. In another embodiment it contains multiple blocks of content in an order defined by the supporting structure 558. For example, one of the layout options for the list pane 1020 allows a single TAMM to be expanded to show its constituent parts. In the context of such an embodiment, a single TAMM acts as a self-contained record of a conversation. In one embodiment, each content block 555 has an internal reference number in the supporting structure 558 to allow specific parts of a TAMM conversation to be referenced. The internal references may have a simple ordering, such as a straight temporal ordering, or the ordering may be more complex, such as a tree or graph.

One particular type of content block 555 is the link. A link may refer to other parts of the same TAMM, to other TAMMs, to subsections in other TAMMs, or to other URIs. In one embodiment, a TAMM link can be defined in terms of the direction information can travel using the link. For example, one embodiment uses standard links that allow the two-way travel of content and focus (user attention). Another embodiment only allows data to travel along the link, whereas a third link only allows the transfer of focus (user attention). A fourth embodiment defines directional links; data or focus can only travel one way on the link. A fifth embodiment defines a permissioned link—a link that only allows travel if the correct user is using the link. To preserve permissions, a sixth embodiment uses two-sided links—links in which the outgoing link (in the current document) and the incoming link (in the linked document) cooperatively control the behavior of the link. If the two sides of the link do not agree, the link can only be used to the extent of the lesser permissions.

The goal section 560 allows a TAMM to have a "direct object" that the other "verb" or "noun" parts of the TAMM can refer to. In one embodiment, the goal section 560 is manipulated collaboratively in a joint edit metaphor. In another embodiment, the goal section is manipulated serially in a workflow metaphor. The precise manipulation mechanism depends on the implementation details in each embodiment and the type of the TAMM as discussed below. In other embodiments, the goal section 540 acts as similarly to the content section 550 discussed above, with integral content blocks and supporting structures—the difference existing in the interpretation of the section by the user as opposed to the implementation of the section.

One particular embodiment uses the goal section 560 to facilitate a "shared page" metaphor between participants. The shared page is the authoritative repository for content and information about a particular transaction. Because all participants in the TAMM exchange are able to work from the same worldview, email failings such as multiple storage of an object and version clash can be avoided.

The workflow/application section 570 may contain one or more code modules, permitting active content to be embedded within a TAMM. These code modules can be sandboxed to allow the safe execution of semi-trusted or untrusted instructions within the context of a TAMM. For example, one embodiment uses embedded JavaScript code or java archives within the workflow/application section. The TAMM client module includes an interpreter module that can access and interpret the embedded code. This embedded code can programmatically access and modify the contents of the email in a manner defined by the TAMM author. In one embodiment, the structure of the TAMM is defined by an XML DOM. The code modules are able to manipulate the DOM and so affect the TAMM. In another embodiment, the code modules are instructions allowing calls out to a TAMM API defined in the broader TAMM environment. Each call can be checked for safety before it is executed.

The signature section 580 allows portions or all of the TAMM to be signed. In one embodiment, these signatures are just strings indicating consent or acceptance of the contents of the email, such as s/John Jones/. In other embodiments, these signatures are cryptographic signature functions capable of verifying that one or more parts of the TAMM object have not been altered. In some embodiments, TAMM client modules have built-in support for signing TAMMs as well as verifying the signatures of other participants.

The comments section 595 represent the immutable comments added to the TAMM on each modification of the TAMM.

Those skilled in the art will notice that there are no inherent restrictions on what is in the TAMM. Similarly, there are no inherent restrictions on the authorship of each portion of a TAMM. The permissions section 540 may place limits on the contents or authorship in any particular TAMM, but those restrictions are not inherent to the system.

The ability for a single TAMM to encompass multiple authors and multiple content blocks allows certain embodiments to embrace metaphors other than that of email. For example, one embodiment is a TAC, an alternative to traditional instant messaging and chatroom systems. Each exchange is conceptualized as a different content block 555 in a temporal order defined in the supporting structure 558. As well as serving as a full replacement for traditional chat, one embodiment uses the guid 530 and internal content references to allow each exchange within the TAC session to become a first-class member in a conceptual hierarchy defined over one or more TAMMs/TACs.

Another example of an alternative embodiment is a "live" organizational structure. The different content blocks 555 represent or link to different parts of an organizational hierarchy. Each content block uses a "pull" data link to demand-fetch its content from linked TAMMs, such that a user of the top-level organizational chart email can get a "dashboard" view of an entire organization by viewing a single TAMM.

In other embodiments, the flexibility of the content, goal, and workflow/application sections within a TAMM/TAC object allow for substantial interactivity between participants. For example, some embodiments may include "immersive" exchanges, using metaphors such as a conference, a seminar, a speech, a shared desktop, a whiteboard, an interview, a party, etc.

In some embodiments, the flexibility of individual TAMM objects can be reduced to introduce greater support for structured transactions. This is known as "typing" a TAMM. In one embodiment, the typing of a TAMM allows control over the potential TAMM addressee types. In another embodiment, the type controls the (potentially attributed) structure of the content section 550 or the goal section 560. In a third embodiment, the type controls the metaphor used to edit the TAMM Object (joint editing, workflow, etc.). In a fourth embodiment, the type controls the permissions granted to each addressee both absolutely (for the life of the TAMM) as well as temporally (to grant and revoke permissions in a workflow-oriented TAMM Object).

The combination of TAMM typing and internal TAMM structure allows some embodiments to make transactional guarantees. Specifically, the content sections, comments, latest version number increment and message delivery are performed in a single atomic transaction. If the content sections or comments cannot be updated, the messages will not be delivered. Conversely, if the messages cannot be delivered the transaction will be rolled back. In one embodiment, the content and comments and message queue are updated in a single atomic transaction. Guaranteed message delivery ensures that the messages are delivered. According to another embodiment, the "transaction" refers to atomicity of a particular access or modification. For example, one embodiment uses a TAMM that is internally structured as a database; access to and modification of the contents is subject to ACID requirements familiar from traditional relational and object databases. In another embodiment, the 'transaction' refers to a business transaction. In this embodiment, a business transaction refers to a particular document which maintains integrity constraints throughout its lifecycle. For example, one embodiment uses an invoice-typed TAMM to track a particular purchase. The workflow/application section 570 includes a well-defined lifecycle for the TAMM defined in terms of a state machine. The invoice can only be manipulated subject to the constraints imposed by the state machine. In this embodiment, only structured attributes are allowed, and the transactional TAMM contains within the content blocks 550 an authoritative audit trail recording each manipulation. In a third embodiment, a particular TAMM is subject to both business transaction rules and ACID constraints.

Many types of TAMMs are contemplated. For example, one embodiment uses a "standard" TAMM. This TAMM is analogous to an email thread in that it is designed to start a discussion about some subject.

Another embodiment defines a "notification" TAMM. This TAMM notifies a particular addressee about something. The notification TAMM may or may not be updateable. An updateable notification allows the notification to be updated after creation. A non-updateable notification does not allow the notification to be updated after creation. For example, one embodiment of an updateable notification contains information about a meeting. Whenever the meeting information changes (location or time), the notification can be updated.

Another embodiment defines an "agreement request" TAMM. The purpose of agreement request is to achieve agreement on some point. For example, a user may be trying to reach agreement on the time of a meeting or on contract terms. The agreement request may be modeled as a single or a multi-round negotiation, with the goal section containing the continually updated tentative agreement. In an exemplary embodiment, a designated addressee "coordinator" is able to execute an update agreement action. Negotiators can accept or decline the agreement. A single-round TAMM would only allow one opportunity to accept; a multi-round would provide an opportunity to accept or reject after each update.

Another embodiment defines a "vote" TAMM to take a poll on some issue. The vote initiator can control whether the vote is anonymous or open, as well as determining the viewability of the vote summary contained in the goal section.

Another embodiment defines an "approval" TAMM to garner approval for some course of action. For example, a person could use an approval TAMM to get a vacation request approved. In an exemplary embodiment, one user (the approval seeker) creates the TAMM. Another user (the approver) can either approve, decline or forward the approval TAMM. Another embodiment allows the approver to make one or more annotations to one or more portions of the TAMM before forwarding.

Another embodiment defines a "response requested" TAMM for RSVPing or otherwise assuring the presence or attention of another party. In one exemplary embodiment, a response requested TAMM can be automatically created to accompany some other TAMM.

Another embodiment defines a "grid" or "gridset" TAMM. In one embodiment, the purpose of a grid TAMM is to represent a grid or array data structure. Multiple grids can be created, each in its own named 'worksheet'. If multiple worksheets are created, the embodying TAMM is called a gridset.

Another embodiment defines a "table" or "tableset" TAMM. In one embodiment, a table TAMM extends a grid to include attributed columns and ordered rows. Multiple tables can be created, each in its own named 'worksheet'. If multiple worksheets are created, the embodying TAMM is called a tableset.

In one embodiment, a TAMM user creates an application from a table or tableset. This is done by capturing the current state of the table as a prototype of the application, with placeholder variable used to represent the possible inputs from other users. The resulting application appears as a new TAMM.

Another embodiment defines a "calendar" TAMM to represent a shared calendar between a set of users. In one embodiment, different parts of a grid are given attributes corresponding to days, weeks, months, and years. Users attach other TAMMs to different parts of the calendar grid to represent appointments, reminders, etc. In another embodiment, appointments, meetings, tasks, and projects are all individual TAMM types that can interact with, refer to, and be referred to by the calendar.

Other TAMM types are contemplated in connection with various use cases. For example, other embodiments may define photo album, playlist, map, note, order, shipment, invoice, and payment TAMMs. The flexibility of the TAMM system allows many metaphors to be instantiated into a TAMM to allow diverse structured interactions.

II. Processing for Transactional, Addressable Communication

Referring to FIGS. 3A-3D, flow charts for managing transactional, addressable communication in accordance with an embodiment of the present invention, are shown.

Figure 3A:
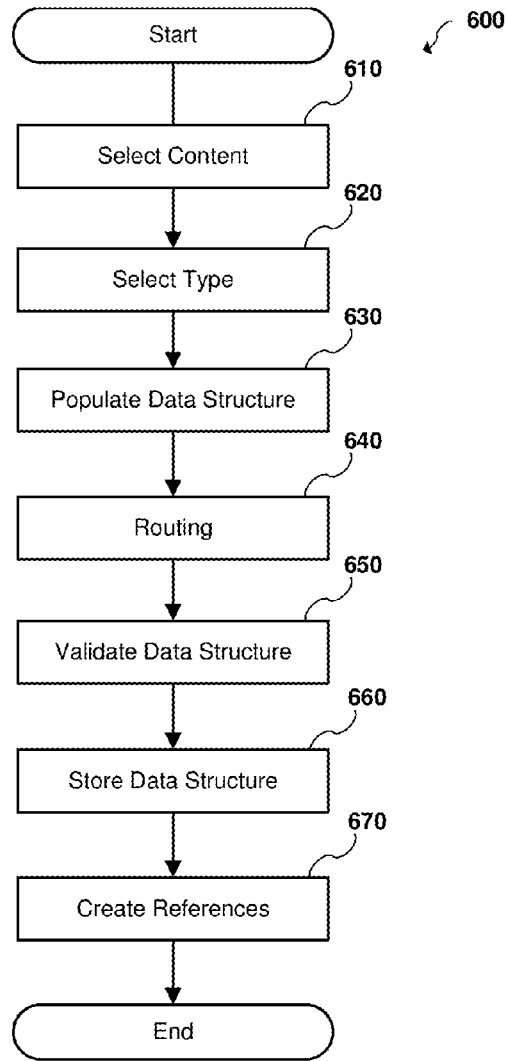
FIGS. 3A-3D are flow charts illustrating a method for managing transactional, addressable communication in accordance with an embodiment of the present invention.

Referring to FIG. 3A, a flowchart illustrating TAMM creation according to one embodiment, is shown. At step 610, an operator selects the TAMM context. In one embodiment, this is a global context. In a second embodiment, this is an organization context. In a third embodiment, the TAMM is in an application or mini-application context. In a fourth embodiment, this is an operator-defined context. In a fifth embodiment, the TAMM has different portions that correspond to different contexts. In a sixth embodiment, the context of the TAMM is implied by the context in which the TAMM creation procedure is invoked or the context in which the TAMM user is operating.

At step 620, the operator selects the type of TAMM to create. On one embodiment, this is done through an API call. In a second embodiment, the operator is presented with a variety of options, such as a drop-down box, and the operator's choice is determined by mapping mouse clicks and key presses to active areas in the TAMM creation application. In a third embodiment, a rule engine evaluates the TAMM context to prune the available types. In a fourth embodiment, the TAMM creation application uses a default setting for the type.

At step 630, various parts of the TAMM structure are populated with data. For example, the operator can enter one or more addresses, a subject, comments, goals, attachments, and other type-specific information. In one embodiment, this is done via one or more API calls into the TAMM application. In a second embodiment, a GUI is used to present a form to an operator; the operator is able to fill in the form using a keyboard and mouse. In a third embodiment, the data is fetched from a storage module such as a database.

In a fourth embodiment, an auto completion module assists the operator in populating the TAMM. This auto completion module can be implemented in various ways. For example, one auto completer fetches information, such as address information, from a central server. The GUI has a drop-down box of suggested completions for the operator to pick. Another auto completer performs a contextual analysis and provides recommended data for various fields.

In a fifth embodiment, a scanner module performs validation or checking on provided data. For example, one scanner performs spell-checking on provided input. Another scanner does a virus check on attachments or content blocks. A third scanner parses provided data, such as XML data, for well-formedness or adherence to some outside specification.

In a sixth embodiment, an authorizer module performs one or more tests on the operator before accepting data. For example, one authorizer module presents a CAPTCHA to verify the presence of a human operator. Another authorizer processes a key, passphrase, or other cryptographic data. A third authorizer matches operator-provided data against one or more rules before accepting the data.

In a seventh embodiment, a security module encrypts one or more portions of the TAMM before or after filling in the TAMM data structure.

At step 640, a receiver module routes the TAMM to the proper destination. In one embodiment, the receiver uses a load balancer module to redirect the TAMM to the operator's "home" TAMM receiver computer, as indicated by a hidden data field in the TAMM. In a second embodiment, a peer-to-peer connection is established between the TAMM creator computer and the TAMM receiver computer. In a third embodiment, the TAMM is stored in a database allowing all subscribers to that database to instantly "see" the TAMM. In a fourth embodiment, a routing algorithm is used to pass the TAMM to the receiver computer.

At step 650, the receiver computer validates the TAMM. In one embodiment, the validation is done via a session verification module. The session verification module uses information embedded in the TAMM to verify the operator's session information, including authentication and authorization information. In a second embodiment, the content of the TAMM, including any state engines in the Workflow/Application section 570, are validated. Embedded state engines may need to have their inputs and internal states check for consistency. Similarly, embedded signatures may be used to verify the authenticity of the TAMM before it is accepted. Another implementation may verify that the TAMM obeys type-related constraints.

At step 660, the TAMM is stored by a storage module. In one embodiment, the TAMM is directed to either a "global" database of all shared TAMMs. In a second embodiment, a local storage unit, such as an organization receiver is used. For example, the TAMM is put in a data store on a receiver computer local to a particular organization or organizational unit. In another example, the TAMM is stored in the working area of an application execution environment. The TAMM incorporates the data and instructions necessary for the execution environment to "run" the TAMM as an application. In a third embodiment, the TAMM is put in a data store defined in a user-provided schema. In a fourth embodiment, "storing" the TAMM involves storing references to the different parts of the TAMM already resident on various computers. In a fifth embodiment, a guid is associated with the TAMM during storage; the guid is communicated back to the creating computer. In a sixth embodiment, storing the TAMM is not complete until an auditing record is created or updated. In a seventh embodiment, different parts of the TAMM may be put in different stores. For example, attachments may be put into a versioned file store, metadata put into a relational database, and content blocks put into a full-text database.

In step 670, one or more TAMM references (messages) are created. In embodiments which use user groups or aliases, the user groups are expanded and the aliases resolved to TAMM addresses. For each TAMM addressee, a TAMM reference is created and sent to the addressee's inbox. The TAMM reference specifies the version of the TAMM at the time of reference creation (contemporaneous version). Accordingly, when the reference is used to view the TAMM, it may be used to view the TAMM either in its latest state or in its contemporaneous state. Viewing the TAMM in a contemporaneous (often non-latest) state is similar to viewing an email at a particular point in time. According to one embodiment, this is accomplished by updating a database with a flag. In another embodiment, the TAMM client software subscribes to a particular feed, such as an RSS or ATOM feed, and the TAMM reference is provided over that feed. In a third embodiment, the TAMM reference is formatted as an RFC 2822 message and passed to an SMTP server. Other embodiments may use RPC protocols such as CORBA, DCOP, XML-RPC or SOAP to communicate a TAMM reference. In general, any messaging service known in the art can be used to carry a TAMM reference or notification.

Figure 3B:
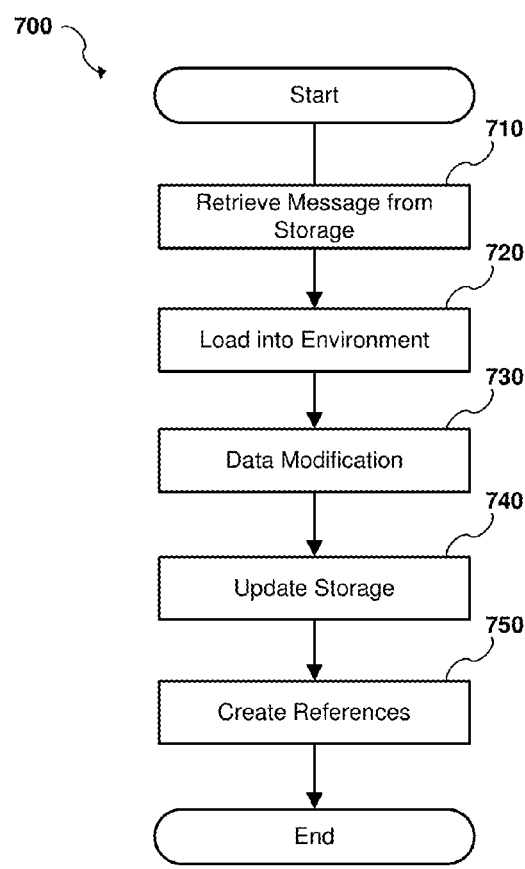

Referring to FIG. 3B, one embodiment of the TAMM update procedure is shown. At step 710, the TAMM is retrieved. The retrieval may occur because an operator clicked on a TAMM link or TAMM reference, or the retrieval may occur because of programmatic access to the TAMM system. In one embodiment using a relational database, one or more fields serve as primary keys. The TAMM is retrieved by joining the various tables into a single data structure. In a second embodiment using an object database, the guid 530 is used as an access key for TAMM retrieval. In a third distributed embodiment, a redirector sends the retrieval request to the appropriate computer before the TAMM is retrieved.

At step 720, the TAMM is loaded into the environment. In one embodiment, a guard module is used to manage the loading of and access to the TAMM. The loading operator or process needs to be authenticated and authorized before access to the TAMM is allowed. This may occur prior to retrieving the TAMM, prior to loading the TAMM, or subsequent to loading but prior to access.

In a second embodiment, the TAMM is loaded into an application execution environment. This may be implemented by examining the state engine in the TAMM itself, or by using instructions within the TAMM to drive an external state engine. Another implementation uses the TAMM viewer application as the application execution environment, and mediates all interaction with the TAMM through that interface.

In a third embodiment using roles, the role-specific view is calculated. The permissions on different parts of the TAMM may only allow operators with certain permissions to edit, view, or otherwise interact with the restricted portions in the TAMM. The loader module calculates the viewable and actionable parts of the TAMM and only presents those parts to the operator. This may also involve changing the user interface of the TAMM, particularly for typed TAMMs. Similar views can be calculated based upon workflow state or typing information.

At step 730, data is entered into or modified in the TAMM. This may involve simple data entry, state changes within the TAMM, modification of metadata in the TAMM, or interactions with one or more applications in the Workflow/Application portion of the TAMM. In one embodiment, this is done via one or more API calls into the TAMM application. In a second embodiment, a GUI is used to present a form to an operator; the operator is able to fill in or modify the information in the form using a keyboard and mouse. Some embodiments may use auto completion, scanner, authorizer, or security modules as described above.

At step 740, the TAMM storage is updated. Depending on the particular embodiment, this may encompass updating a "global" data store, an "organization" data store, a user-defined data store, or some combination of the above. In one embodiment a redirector module, as described above, is used to mediate the storage requests in a distributed system. Updating the TAMM storage may involve small updates to multiple data stores; for example, an update might require an UPDATE in a relational database, a re-indexing in a full-text search database, a new version in a versioned file store, and various new associations in an object database.

At step 750, one or more TAMM references may need to be created. For example, a "widening" of the TAMM permissions or addressee list can result in the creation of a new TAMM reference. Another embodiment provides an audit trail by generating and recording TAMM references after each access and change to the TAMM. A third embodiment uses TAMM references for change notification or workflow routing. The creation of the TAMM references may occur as described above.

Figure 3C:
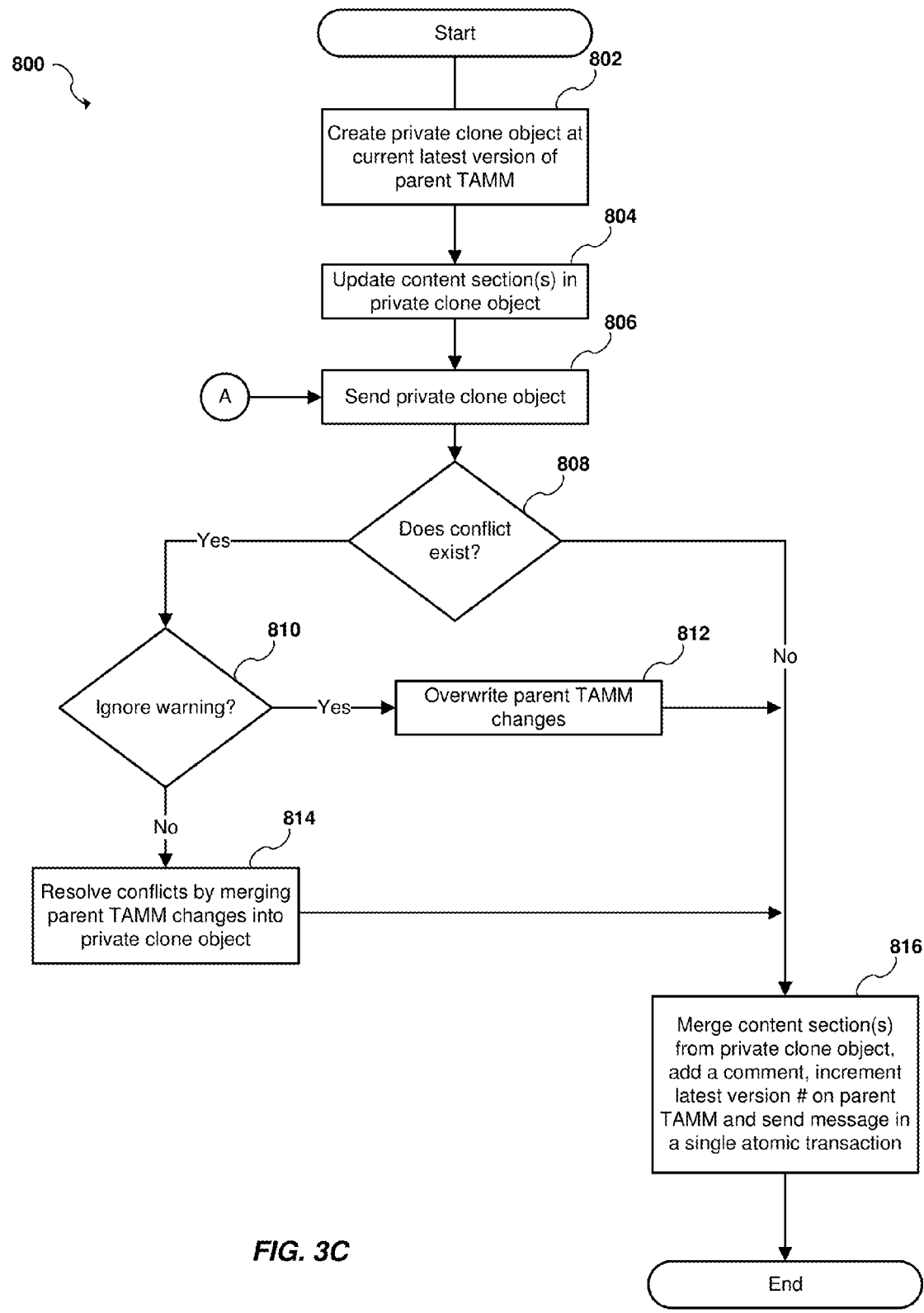

Referring to FIG. 3C, a flow chart for managing transactional, addressable communication illustrating a private cloned object of a TAMM in accordance with an embodiment of the present invention, are shown. At step 802, a private clone object is created at the current latest version of the parent TAMM. This version is called the root version in the private cloned object. All content is copied at the root version. The content section(s) are updated in the private cloned object at step 804. At step 806, the private cloned object is sent. A determination is made as to whether any conflicts exist, at step 808. If a conflict doesn't exist, then at step 816, the content section(s) are merged from the private cloned object, a comment is added, the latest version # on the parent TAMM is incremented and the TAMM is sent in a single atomic transaction. If a conflict does exist, then at step 810, a determination is made as to whether the conflict should be ignored. If the conflict is ignored, then the parent TAMM changes are overwritten at step 812. If the conflict is not ignored, then at step 814, the conflicts are resolved by merging the parent TAMM changes into the private cloned object.

Figure 3D:
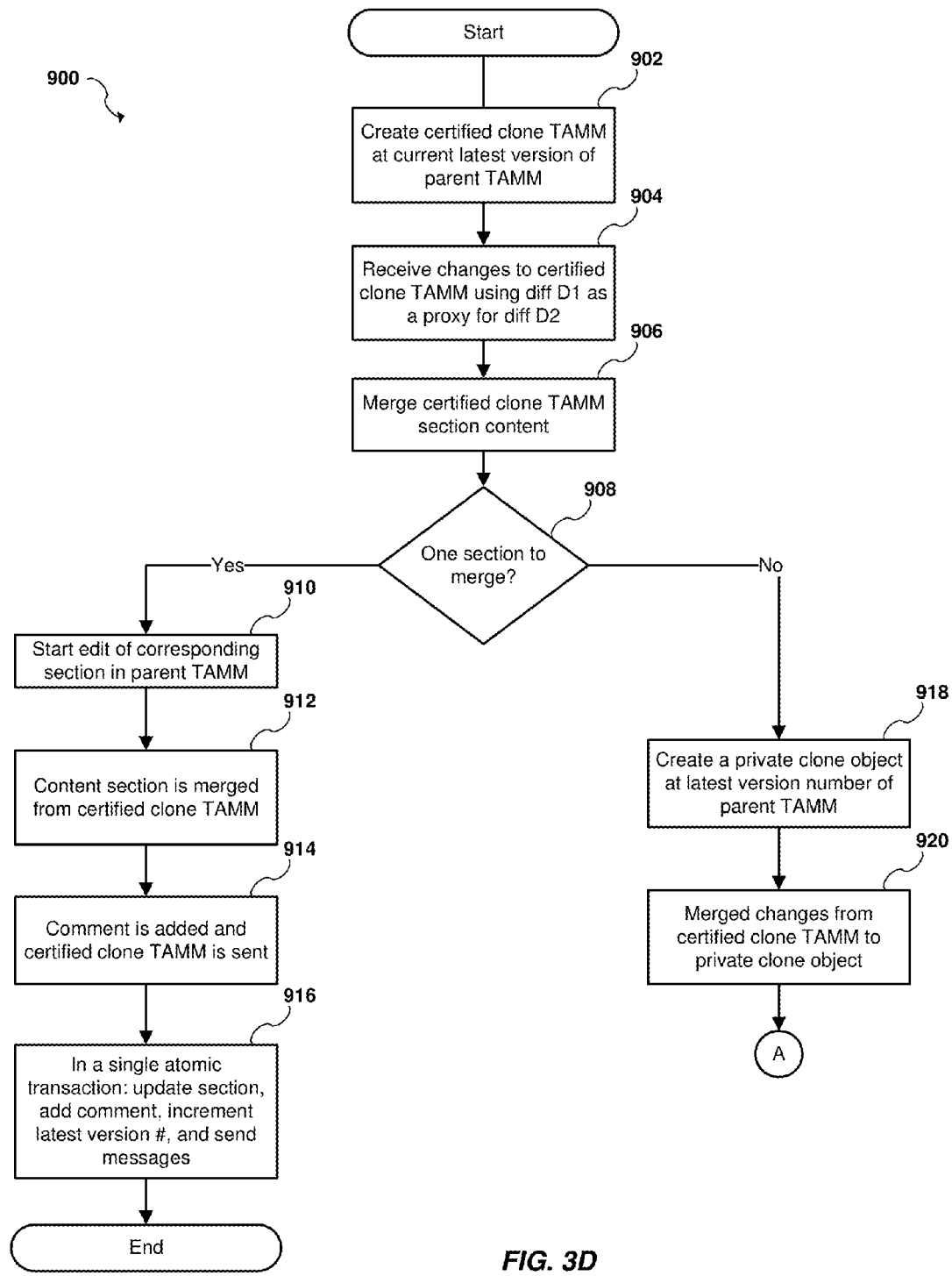

Referring to FIG. 3D, a flow chart for managing transactional, addressable communication illustrating a coordinated collaboration with a certified clone TAMM in accordance with an embodiment of the present invention, are shown. At step 902, a certified clone TAMM ("CCTAMM") is created at the latest parent TAMM version number. Changes to the CCTAMM are made using differences between the CCTAMM latest and the CCTAMM #1 (referred to herein as "diff D1") as a proxy for difference between the CCTAMM latest and the parent TAMM root version (referred to herein as "diff D2"), at step 904. At step 906, a changed to the parent TAMM is added by merging the CCTAMM section content. A determination is made as to whether there is only one section to merge at step 908. If only one section is merged, then at step 910, the corresponding section of the parent TAMM is edited. At step 912, the content section is merged from the CCTAMM. A comment is added and the message is sent at step 914. At step 916, in a single atomic transaction, the section is updated, a comment is added, the latest version # is incremented and messages are sent. If more than one section is merged, then at step 918, a private clone object is created at latest version number of parent TAMM. The changed from the CCTAMM is merged to the private clone object at step 920. Processing then continues at step 806 of FIG. 3C.

III. Exemplary User Interfaces

Figure 4A:
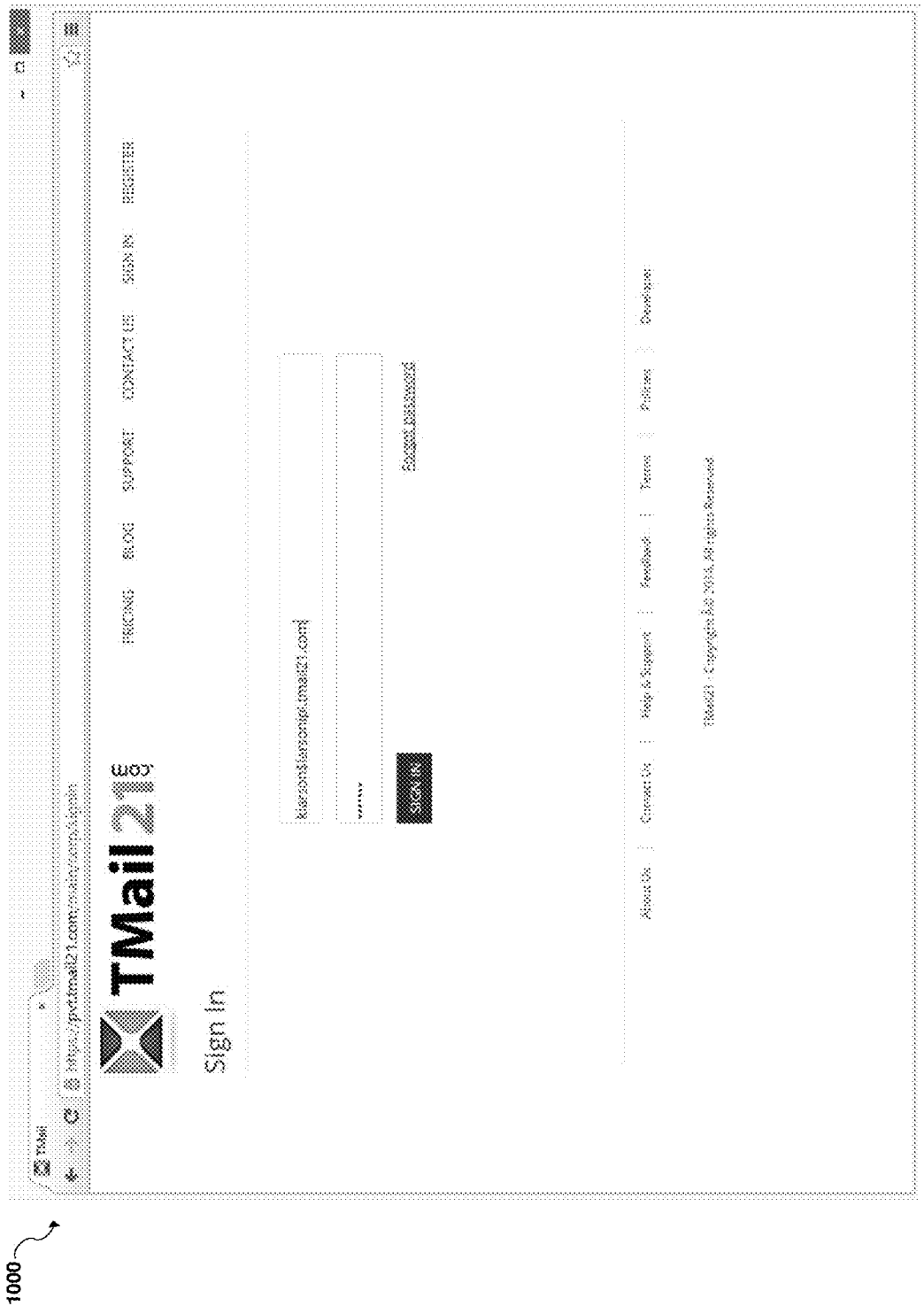
FIGS. 4A-4B illustrate exemplary user interfaces for managing transactional, addressable communication in accordance with an embodiment of the present invention.
Figure 4B:
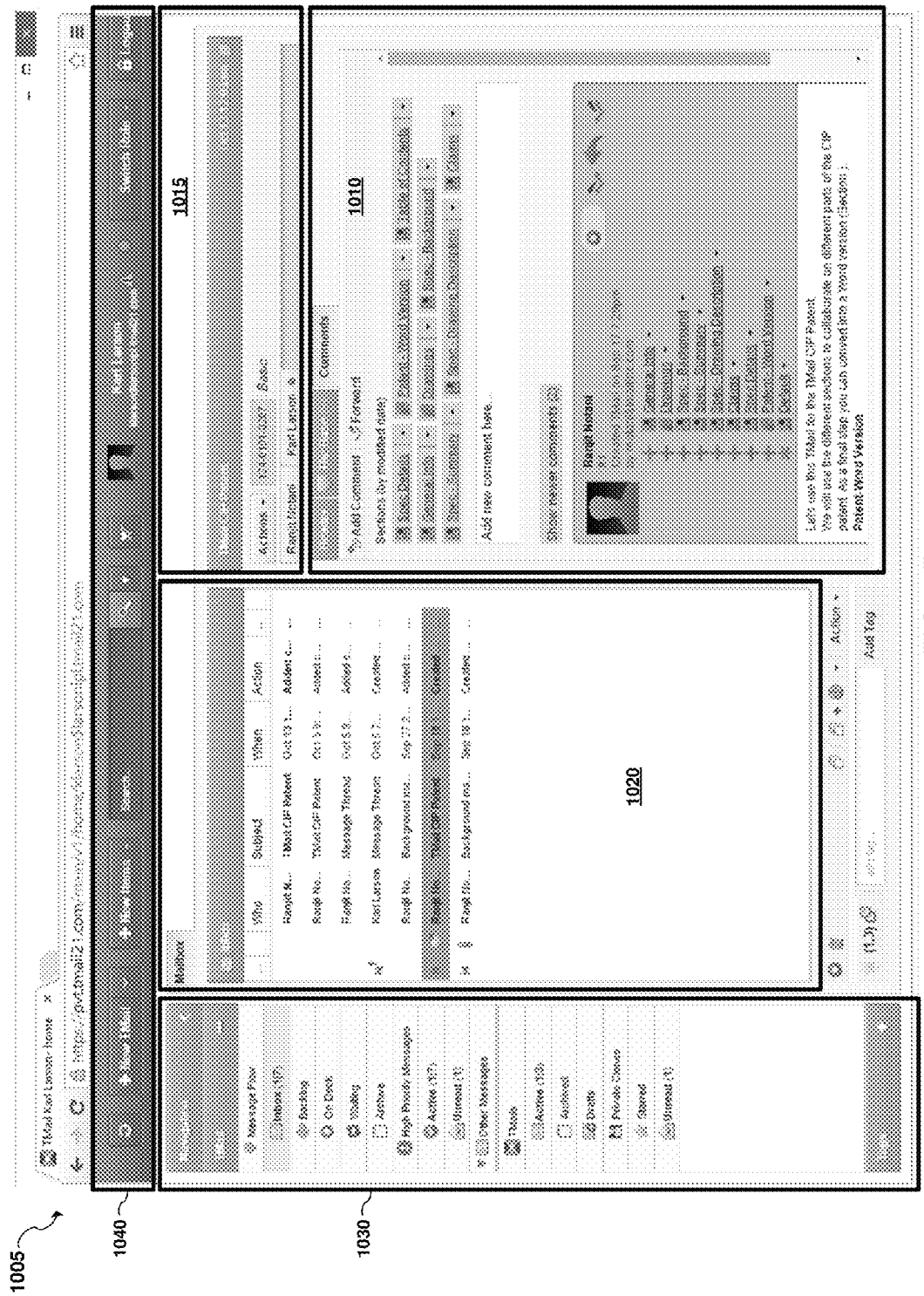

FIGS. 4A-4B illustrate exemplary user interfaces for managing transactional, addressable communication in accordance with an embodiment of the present invention. It is understood that other user interfaces are possible within the scope of the invention and that the graphical user interfaces shown are not intended to be limiting to the present invention.

Turning to FIG. 4B, the user interface of one illustrative client module is generally referenced by the number 1005. In this embodiment, the user interface is provided by a traditional "thick client" module, similar to an email client program. In another embodiment, the user interface is defined in a file sent over the network, such as an HTML or XML document; a local rendering module draws the interface.

A three pane interface is denoted by the areas marked 1010, 1020, and 1030. Area 1010 is the TAMM object pane, adapted to display the current TAMM object as well as present tools for working with the specific TAMM type. As shown, the pane includes various content sections of various types (e.g., spec details, patent-word version, etc.) Section 1015 displays an area where metadata about the TAMM may be displayed or manipulated. In particular, the unique tracking number (124-0101-0207 in this example) is displayed here. Area 1020 is the list pane, adapted to display different groups of TAMM messages filtered and organized in different ways. In the view, the TAMM is being viewed at a contemporaneous (non-latest) state. In this view, a contemporaneous state is always indicated by an orange indicator. Specifically, in this example, the TAMM is being viewed (change #1). This is how an email client typically works. However, by clicking on the "show newer comments (2)" button, the user can easily view the TAMM at the latest state (change #3). Similarly, the user can view all content sections either at the contemporaneous version (change #1) or latest version (change #3) by a simple click of a button. In one embodiment of the List pane, the pane includes a list of messages, each of which is a reference to a particular version of the TAMM. In another embodiment, the list shows a list of TAMM references which refer to the latest state of the TAMM. In yet another embodiment, a threading view is presented. Another embodiment includes a list view organized and sortable by date, originator, last participant, TAMM status, and other metadata. Yet another embodiment uses a graph view to describe connections between TAMMs and allow manipulation and viewing of interconnected TAMMs. Another embodiment expands a single TAMM to show the interactions within that TAMM. Yet another embodiment allows several types of views, including the views stated above, to be optionally employed. Area 1030 is a grouping pane, adapted to show and focus on the organization of different TAMM collections. For example, one embodiment uses different levels of generality to organize TAMMs, such as "private," "group," "company," and "anyone." Another embodiment uses a hierarchical or graph structure to link groups of TAMMs. A third embodiment uses various sortable lists and a paging mechanism. A fourth embodiment uses a search interface to locate "tagged"

TAMMs. TAMMs retrieved through the search mechanism are presented in a list below the search box. The final area, marked 1040, is a global application toolbar in which different common tools are presented for working with the TAMM system or with individual TAMMs. For example, one embodiment includes a "compose" toolbar allowing one-click creation of TAMMs.

In one embodiment, many apparent views of the TAMM are provided through the use of TAMM references. These references are "personalized views" on a TAMM, and can be transparently used as if they were actually the TAMM, even though the actual TAMM is only stored in one place. In different embodiments, TAMM references may have different attributes associated with them. For example, one set of TAMM references are used to track the read/unread status of TAMMs. In another embodiment, references are used to implement tagging and categorization operations. In a third embodiment, references are used to allow offline readers to "download" TAMM information for disconnected use. In a fourth embodiment, references are used to notify others about the existence of a TAMM.

IV. Other Modifications and Variations

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

This invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the invention may be embodied as a method, device, or computer program product. Accordingly, the present invention may take the form of an entirely hardware embodiment or an embodiment combining software and hardware aspects all generally referred to herein as a "circuit" or "module."

The present invention thus includes a computer program product which may be hosted on a computer-usable storage medium having computer-usable program code embodied in the medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Computer program code for carrying out operations of the present invention may be written in an object oriented programming language such as Java®, Smalltalk, C# or C++. However, the computer program code for carrying out operations of the present invention may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. A system for providing a transactional, addressable shared mail object over a network, the system comprising:
   a first node connectable to the network for generating and communicating a non-duplicated shared mail object having content and accessible to a plurality of users and for routing a reference to the shared mail object, the shared mail object having a unique identifier, an address section, a metadata section, a comments section, a content section and one of a permissions section, a goal section, and a signature section, wherein the unique identifier comprises a globally unique identifier; and
   a second node connectable to the network for receiving the reference to the shared mail object, wherein the shared mail object is identified over the network using the unique identifier and the shared mail object is accessible to the second node via the reference,
   the content of at least one section of the shared mail object is transactionally modifiable after the second node has received the reference to the shared mail object, wherein a change to the content of the modifiable section of the shared mail object is atomic, consistent, isolated and durable with respect to each of the plurality of users, without duplication of the shared mail object, and the content of the modifiable section of the shared mail object is at all times consistent for the first and second nodes, and wherein all transactional modifications to the shared mail object are made according to ACID properties, where all transactional modifications to the shared mail object are atomic, the shared mail object proceeds from one consistent state to another consistent state, concurrent modifications to the shared mail object result in a shared mail object that would be obtained if each of the transactional modifications were executed in serial isolation, and once a transactional modification is committed to the shared mail object, the transactional modification will be durable even in the presence of a computer power loss or computer crash.

2. The system of claim 1, wherein the shared mail object further comprises a workflow section.

3. The system of claim 2, wherein the workflow section comprises one of a state machine and computer-interpretable instructions.

4. The system of claim 1, wherein the content section comprises multiple content blocks.

5. The system of claim 1, wherein the shared mail object has a type selected from a group consisting of an unstructured type, a chat type, a dashboard type, a notification type, an agreement request type, a poll type, an approval request type, a response request type, a grid type, a gridset type, a table type, a tableset type, a calendar type, a photo album type, a play list type, a map type, a note type, an order type, a shipment type, an invoice type, and a payment type.

6. The system of claim 1, wherein the reference comprises a Universal Resource Identifier (URI), and wherein the shared mail object is individually addressable over the network via the Universal Resource Identifier (URI).

7. A computer program product embodied on a non-transitory computer readable medium for creating a transactional, addressable communication over a network, wherein the computer program is implemented by one or more processors executing processor instructions, the computer program product comprising:
  a first computer code for selecting a context for the communication;
  a second computer code for selecting a type for the communication;
  a third computer code for using the context and type to instantiate a non-duplicated shared mail object having content and accessible to a plurality of users for the communication, wherein the shared mail object comprises a unique identifier, an address section, a comments section, a metadata section, a content section and one of a permissions section, a goal section, and a signature section, and wherein the unique identifier comprises a globally unique identifier;
  a fourth computer code for populating the address, metadata, and content sections in the shared mail object;
  a fifth computer code for routing a reference to the shared mail object to a destination over a network;
  a sixth computer code for validating the shared mail object;
  a seventh computer code for storing the shared mail object, wherein the shared mail object is identified over the network via the unique identifier and the shared mail object is individually accessible to the destination via the reference; and
  an eighth computer code for transactionally modifying, at the destination where the shared mail object is stored, the content of at least one section of the shared mail object, wherein a change to the content of the modifiable section of the shared mail object is atomic, consistent, isolated and durable with respect to each of the plurality of users, without duplication of the shared mail object, and the content of the modifiable section of the shared mail object is at all times consistent for each of the plurality of users, and wherein all transactional modifications to the shared mail object are made according to ACID properties, where all transactional modifications to the shared mail object are atomic, the shared mail object proceeds from one consistent state to another consistent state, concurrent modifications to the shared mail object result in a shared mail object that would be obtained if each of the transactional modifications were executed in serial isolation, and once a transactional modification is committed to the shared mail object, the transactional modification will be durable even in the presence of a computer power loss or computer crash at the destination where the shared mail object is stored.

8. The computer program product of claim 7, wherein the context for the communication is selected from the group consisting of a global context, an organization context, an operator-defined context, a mixed context, and an application context.

9. The computer program product of claim 7, wherein the type for the communication is selected from a group consisting of an unstructured type, a chat type, a dashboard type, a notification type, an agreement request type, a poll type, an approval request type, a response request type, a grid type, a gridset type, a table type, a tableset type, a calendar type, a photo album type, a playlist type, a map type, a note type, an order type, a shipment type, an invoice type, and a payment type.

10. The computer program product of claim 7, wherein the shared mail object further comprises a comments section and a user list, and
  transactionally modifying comprises at least one selected from a group consisting of adding a comment to the comments section, adding one or more users to the user list, and modifying the content of at least one section of the shared mail object other than the comments section and the user list.

11. The computer program product of claim 7, wherein routing the reference to the shared mail object to a destination comprises using one of a redirector module, a load balancer, a peer-to-peer connection, and a routing protocol.

12. The computer program product of claim 7, wherein validating the shared mail object comprises verifying one of a session, a state engine, an embedded signature, and type constraints.

13. The computer program product of claim 9, wherein storing the shared mail object comprises putting the shared mail object in one of a global data store, a local data store, a user-defined data store, the working area of an application execution environment, an audit trail, a versioned store, a full-text index, a directory, a relational database, an object database, a key-pair database, a filesystem, and a combination thereof.

14. The computer program product of claim 7, further comprising creating a reference data structure and associating the reference data structure with the shared mail object.

15. A method for interacting with a transactional, addressable shared mail object, the shared mail object, the method comprising:
  using a globally-unique identifier to locate a non-duplicated shared mail object having content and accessible to a plurality of users over a network, the shared mail object having an address section, a metadata section, a comments section, a content section and one of a permissions section, a goal section, and a signature section;
  retrieving the shared mail object from a storage module;
  loading the shared mail object into a working environment;
  transactionally modifying the content of a section in the shared mail object, wherein a change to the content of the modifiable section of the shared mail object is atomic, consistent, isolated and durable with respect to each of the plurality of users, without duplication of the shared mail object, and the content of the modifiable of the shared mail object is at all times consistent for each of the plurality of users, and wherein all transactional modifications to the shared mail object are made according to ACID properties, where all transactional modifications to the shared mail object are atomic, the shared mail object proceeds from one consistent state to another consistent state, concurrent modifications to the shared mail object result in a shared mail object that would be obtained if each of the transactional modifications were executed in serial isolation, and once a transactional modification is committed to the shared mail object, the transactional modification will be durable even in the presence of a computer power loss or computer crash; and storing the modified shared mail object to the storage module, wherein the shared mail object is individually identified and accessible over the network using the globally-unique identifier.

16. The method of claim 15, wherein loading the shared mail object into a working environment comprises one of interacting with a state engine located inside the shared mail object, interacting with a state engine located outside the shared mail object, using a guard module, creating a role-specific view, creating a type-specific view, and creating a workflow-specific view.

17. The method of claim 15, wherein transactionally modifying a section in the shared mail object comprises one of adding information to the section, removing information from the section, changing information in the section, changing metadata in the section, changing metadata about the section, changing permissions in the section, changing permissions on the section, interacting with a state engine located in the section, interacting with a state engine located outside the section, signing the section, encrypting the section, decrypting the section, updating an audit trail, and verifying an audit trail.

18. The method of claim 15, further comprising creating a reference data structure and associating the reference data structure with the shared mail object.

19. The method of claim 18, wherein creating a reference data structure comprises updating a data store, modifying subscribed information, making a Remote Procedure Call (RPC), making an Application Programming Interface (API) call, creating a message, and creating an email.

20. The system of claim 1, wherein the reference comprises the unique identifier.

21. The computer program product of claim 7, wherein the reference comprises the unique identifier.

22. The system of claim 1, wherein the address section, metadata section, comments section, content section, and goal section are modifiable in a single atomic, consistent transaction.

23. The system of claim 22, wherein the address section, metadata section, comments section, content section, and goal section remain consistent relative to each other after the transaction.

24. The method of claim 13, further comprising confirming whether a forwarded or cloned transactional, addressable communication has been altered and identifying the alteration, via the audit trail.

25. The method of claim 13, further comprising computing authoritative differences between states of the transactional, addressable communication via the audit trail.

26. The method of claim 13, wherein the audit trail is used to provide one selected from a group consisting of ensuring authoritative, binding agreements between the parties, and authoritatively certifying all section types including their content.

* * * * *